(12) United States Patent
Ogawa et al.

(10) Patent No.: US 12,267,587 B2
(45) Date of Patent: Apr. 1, 2025

(54) ELECTRONIC APPARATUS AND METHOD FOR CONTROLLING SAME TO FACILITATE IMAGING MODE SELECTION

(71) Applicant: CANON KABUSHIKI KAISHA, Tokyo (JP)

(72) Inventors: Seiji Ogawa, Tokyo (JP); Junko Morikawa, Chiba (JP); Keiko Yamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/156,068

(22) Filed: Jan. 18, 2023

(65) Prior Publication Data

US 2023/0156325 A1 May 18, 2023

Related U.S. Application Data

(63) Continuation of application No. PCT/JP2021/025741, filed on Jul. 8, 2021.

(51) Int. Cl.
  H04N 23/667 (2023.01)
  G02B 7/02 (2021.01)
  G06F 3/0488 (2022.01)

(52) U.S. Cl.
  CPC .......... H04N 23/667 (2023.01); G02B 7/021 (2013.01); G06F 3/0488 (2013.01)

(58) Field of Classification Search
  None
  See application file for complete search history.

(56) References Cited

U.S. PATENT DOCUMENTS

2012/0050578 A1* 3/2012 Aoki ................... H04N 23/667
                                                                    396/529
2022/0053142 A1* 2/2022 Manzari ................. H04N 23/69

FOREIGN PATENT DOCUMENTS

| JP | 2007043325 A | 2/2007 |
| JP | 2012222471 A | 11/2012 |
| JP | 2014059615 A | 4/2014 |
| JP | 2015122677 A | 7/2015 |
| JP | 2018180384 A | 11/2018 |

* cited by examiner

*Primary Examiner* — Quan Pham
(74) *Attorney, Agent, or Firm* — Canon U.S.A., Inc. I.P. Division

(57) ABSTRACT

An electronic apparatus including a first lens and a second lens at a first side, the second lens having a angle of view different from that of the first lens, includes a switching unit configured to switch first imaging via the first lens and second imaging via the second lens, and a control unit configured to control display of items corresponding to a plurality of respective imaging modes, wherein the control unit is configured to, in a case where the second imaging is being performed, control display of a first item and a second item in different display modes, the first item corresponding to an imaging mode that enables the first imaging and the second imaging, the second item corresponding to an imaging mode that enables the first imaging and disables the second imaging.

10 Claims, 18 Drawing Sheets

FIRST SIDE

SECOND SIDE

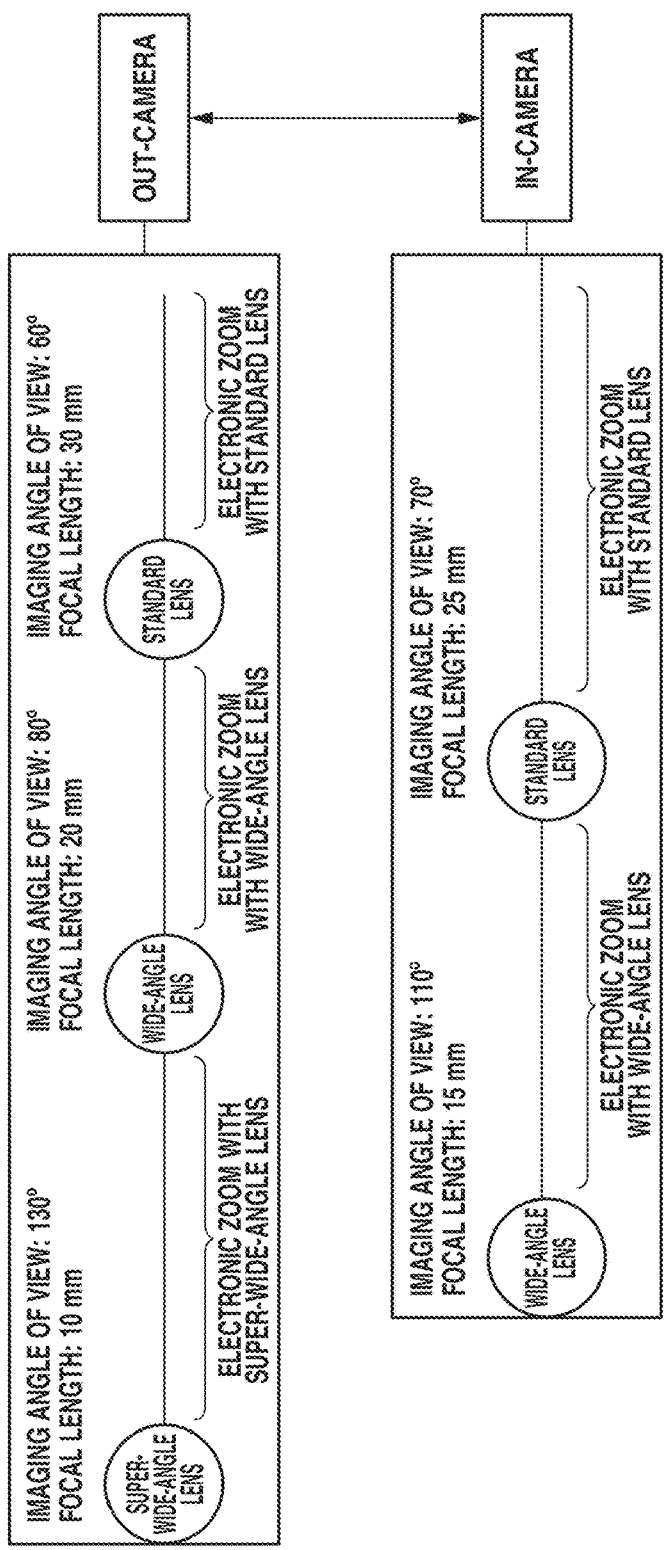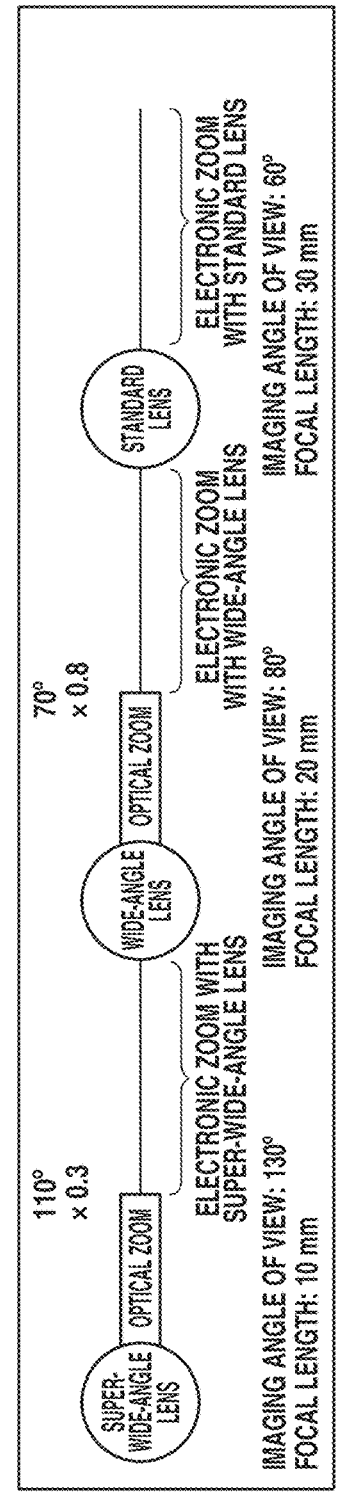
FIG.3A
FIG.3B

ELECTRONIC APPARATUS AND METHOD FOR CONTROLLING SAME TO FACILITATE IMAGING MODE SELECTION

CROSS-REFERENCE TO RELATED APPLICATIONS

This application is a Continuation of International Patent Application No. PCT/JP2021/025741, filed Jul. 8, 2021, which claims the benefit of Japanese Patent Application No. 2020-125164, filed Jul. 22, 2020, both of which are hereby incorporated by reference herein in their entirety.

BACKGROUND OF THE INVENTION

Field of the Invention

The present invention relates to an electronic apparatus and a method for controlling the same, and more particularly to a technique for capturing images via a plurality of lenses.

Background Art

There are electronic apparatuses capable of capturing images from a rear side and a front side of the electronic apparatuses. Patent Literature 1 discusses a plurality of cameras that can be moved to be located at both rear and front sides of an electronic apparatus.

CITATION LIST

Patent Literature

PTL 1: Japanese Patent Application Laid-Open No. 2012-222471

According to the method of Patent Literature 1, it is difficult for a user to understand which imaging mode to select if the user first selects a lens and an angle of view to be used.

SUMMARY OF THE INVENTION

In view of the foregoing issue, the present invention provides an electronic apparatus that can facilitate a user selecting an imaging mode after a lens to be used for imaging is selected from a plurality of lenses.

To achieve the foregoing object, according to an aspect of the present invention, an electronic apparatus including a first lens and a second lens at a first side, the second lens having a angle of view different from that of the first lens, includes a switching unit configured to switch first imaging via the first lens and second imaging via the second lens, and a control unit configured to control display of items corresponding to a plurality of respective imaging modes along with a captured image on a display unit to select an imaging mode from the plurality of imaging modes, the plurality of imaging modes including an imaging mode where the first imaging and the second imaging are switchable and an imaging mode that enables the first imaging and disables the second imaging, wherein the control unit is configured to, in a case where the second imaging is being performed, control display of a first item and a second item in different display modes, the first item corresponding to an imaging mode that enables the first imaging and the second imaging, the second item corresponding to an imaging mode that enables the first imaging and disables the second imaging.

Further features of the present invention will become apparent from the following description of exemplary embodiments with reference to the attached drawings.

BRIEF DESCRIPTION OF THE DRAWINGS

The accompanying drawings are included in the description, constitute a part of the same, illustrate exemplary embodiments of the present invention, and are used to describe the principle of the present invention along with the description of the exemplary embodiments.

FIG. 3A is a diagram for describing lens units of a smartphone 100 according to the present exemplary embodiment.

FIG. 3B is a diagram for describing the lens units of the smartphone 100 according to the present exemplary embodiment.

DESCRIPTION OF THE EMBODIMENTS

Preferred exemplary embodiments of the present invention will be described below with reference to the drawings.

Figure 1A:
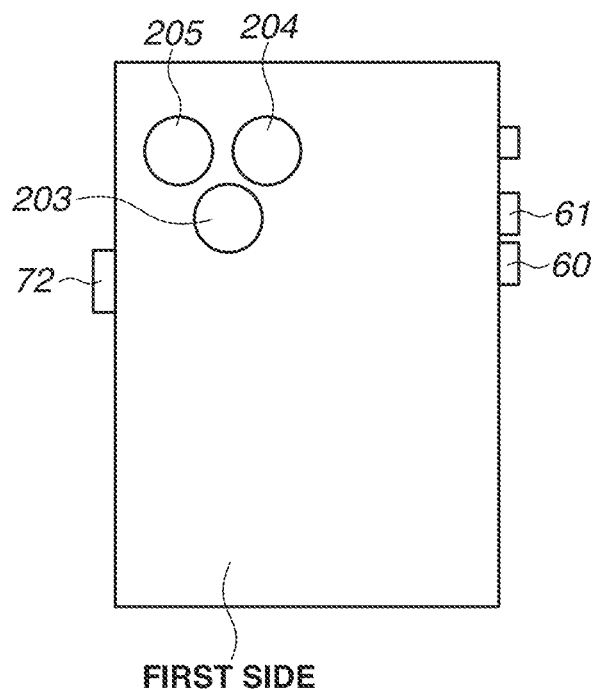
FIG. 1A is an external view of a first side of a smartphone that is an example of an apparatus to which a configuration of the present exemplary embodiment can be applied.
Figure 1B:
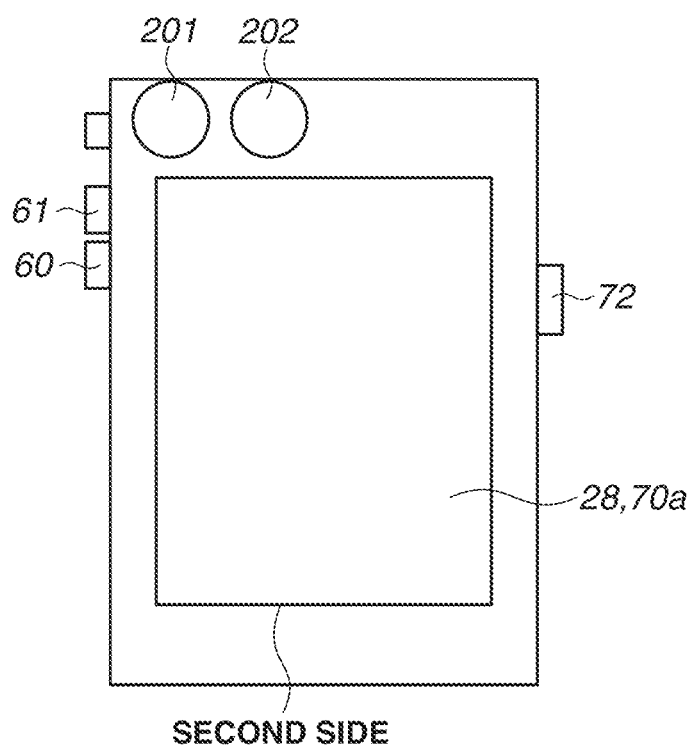
FIG. 1B is an external view of a second side of the smartphone that is the example of the apparatus to which the configuration of the present exemplary embodiment can be applied.

FIGS. 1A and 1B are external views of a smartphone 100 that is an example of an electronic apparatus according to the present invention. FIG. 1A illustrates a rear side of the smartphone 100 opposite a display side. FIG. 1B illustrates the display side of the smartphone 100.

A display unit 28 is a display unit that displays images and various types of information, and includes a touchscreen 70a that can detect a touch operation on the display unit 28. An up key 61 is a button capable of issuing an instruction to increase sound volume and an imaging instruction. A down key 60 is a button capable of issuing an instruction to reduce sound volume, and when simultaneously pressed with a power switch 72, an instruction to record an image displayed on the display unit 28. The power switch 72 is a push button for switching power-on and power-off. Three lens units are disposed on a first side (rear) where the display unit 28 of the smartphone 100 is not located. Two cameras are disposed on a second side (front) where the display unit 28 is located. Due to the respective different focal lengths, angles of view capable of imaging differ. The user can change whether to capture an image including himself/herself standing on the display unit 28 side and holding the smartphone 100 by switching lenses on the first side and lenses on the second side. The user can also capture an image while checking the image being captured on the display unit 28 by using the lenses on the second side.

Figure 2:
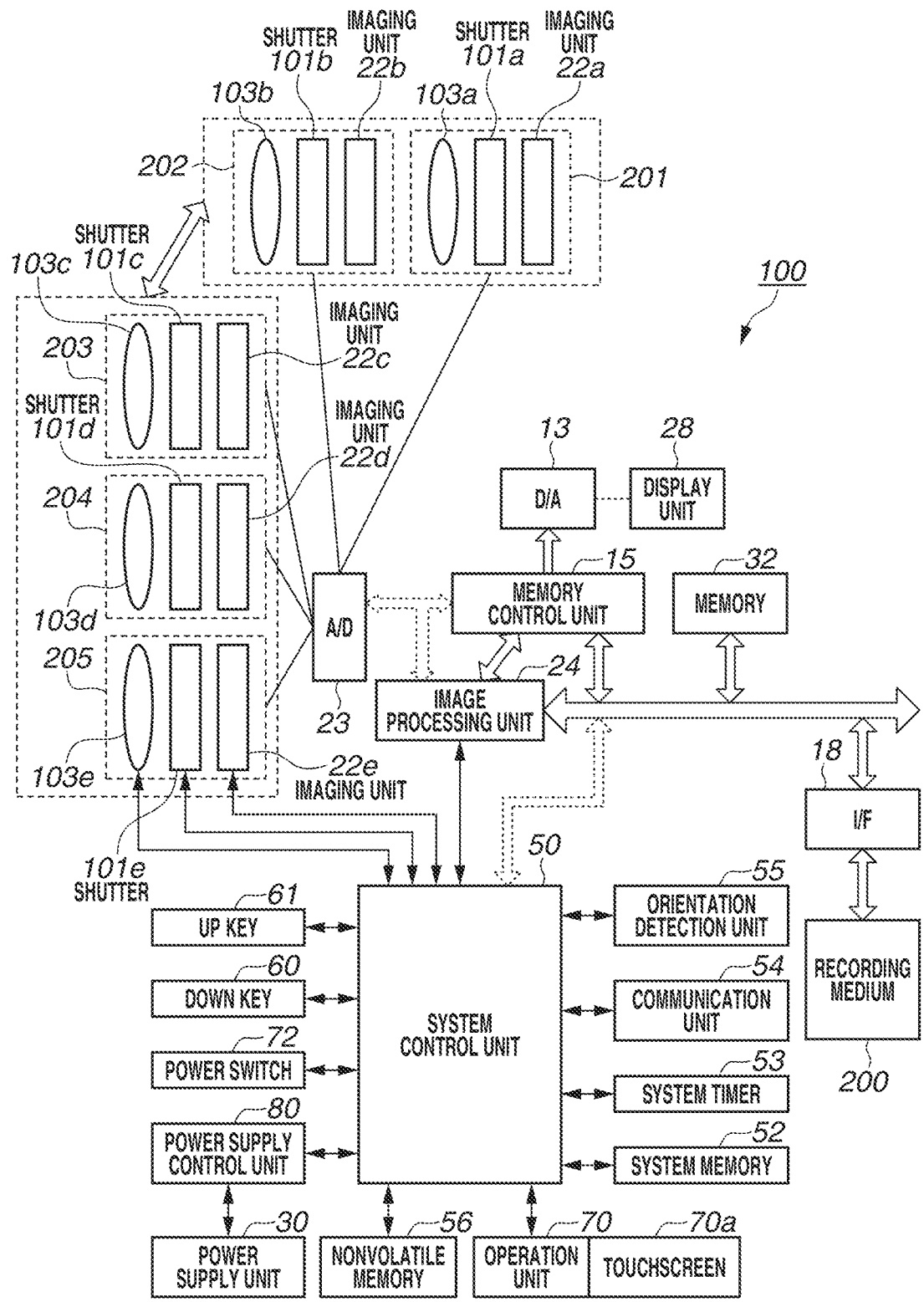
FIG. 2 is a block diagram illustrating a configuration example of the smartphone that is the example of the apparatus to which the configuration of the present exemplary embodiment can be applied.

FIG. 2 is a block diagram illustrating a configuration example of the smartphone 100 according to the present exemplary embodiment.

The smartphone 100 includes lens units 201 to 205. The lens units 201 and 202 are disposed on the second side, and the lens unit 203, 204, and 205 on the first side. Lenses 103a to 103e represent the lenses included in the respective lens units. Some of the lens units may include a plurality of lenses, but is simplified and illustrated with a single lens each.

The lens unit 201 includes a standard lens, and the lens unit 202 a wide-angle lens. The lens of the lens unit 202 can be used to capture an image with a wider angle of view than when the lens of the lens unit 201 is used. The lens unit 203 includes a standard lens, the lens unit 204 a wide-angle lens, and the lens unit 205 a super-wide-angle lens. The lens unit 204 can capture an image with a wider angle of view than the lens unit 203 does. The lens unit 205 can capture an image with a wider angle of view than the lens unit 204 does. Alternatively, if the lenses on the first side are a standard lens, a wide-angle lens, and a telephoto lens, the configuration is as follows:

The lens unit 201 includes a standard lens, and the lens unit 202 a wide-angle lens. The lens of the lens unit 202 can be used to capture an image with a wider angle of view than when the lens of the lens unit 201 is used. The lens unit 203 includes a telephoto lens, the lens unit 204 a standard lens, and the lens unit 205 a wide-angle lens. The lens unit 204 can capture an image with a wider angle of view than the lens unit 203 does, and the lens unit 205 can capture an image with a wider angle of view than the lens unit 204 does.

The following configuration is the same regardless of the types of lenses on the first side.

Shutters 101a to 101e are shutters having an aperture function. Imaging units 22a to 22e are image sensors including a charge-coupled device (CCD) or a complementary metal-oxide-semiconductor (CMOS) device for converting optical images into electrical signals. An analog-to-digital (A/D) converter 23 is used to convert analog signals output from the imaging units 22 into digital signals.

The imaging units 22 are the image sensors including the CCD or the CMOS device for converting optical images into electrical signals. The A/D converter 23 converts analog signals into digital signals. The A/D converter 23 is used to convert the analog signals output from the imaging units 22 into the digital signals. Image sensors 20 are typically CCD- or CMOS-based image sensors. Object images formed on the image sensors 20 through the lens units 201 to 205 are photoelectrically converted and output as electrical signals.

An image processing unit 24 performs resize processing, such as predetermined pixel interpolation and reduction, and color conversion processing on data from the A/D converter 23 or data from a memory control unit 15. The image processing unit 24 also performs predetermined calculation processing using captured image data. A system control unit 50 performs exposure control and distance measurement control using the obtained calculation result. Through-the-lens (TTL) automatic focus (AF) processing, automatic exposure (AE) processing, and electronic flash (EF) (flash preliminary emission) processing are thereby performed. The image processing unit 24 further performs predetermined calculation processing using the captured image data, and also performs TTL automatic white balance (AWB) processing based on the obtained calculation result.

Output data from the A/D converter 23 is written to a memory 32 via the image processing unit 24 and the memory control unit 15, or directly via the memory control unit 15. The memory 32 stores image data that is obtained by the imaging units 22 and digitally converted by the A/D converter 23, and image data to be displayed on the display unit 28. The memory 32 has a sufficient storage capacity to store a predetermined number of still images or a predetermined duration of moving image and sound.

A power supply control unit 80 includes a battery detection circuit, a direct-current-to-direct-current (DC-DC) converter, and a switch circuit for switching blocks to be energized, and detects the presence or absence of a attached battery, the type of battery, and the remaining battery level. The power supply control unit 80 controls the DC-DC converter based on the detection results and instructions from the system control unit 50, and supplies needed voltages to various components, including a recording medium 200, for needed periods. A power switch 72 can switch the power of the smartphone 100 on and off when long-pressed (continuously pressed for a predetermined time such as 2 sec or 3 sec or more). Moreover, the power switch 72 can switch display of the display unit 28 between a hidden state and a display state when pressed for a short time less than the predetermined time.

A power supply unit 30 includes a primary battery such as an alkali battery or a lithium battery, a secondary battery such as a nickel-cadmium (NiCd) battery, a nickel metal hydride (NiMH) battery, or a lithium-ion (Li) battery, and/or an alternating-current (AC) adaptor.

A recording medium interface (I/F) 18 is an I/F with the recording medium 200 such as a memory card or a hard disk. The recording medium 200 is a recording medium such as a memory card for recording captured images, downloaded music, and video images. The recording medium 200 includes a semiconductor memory or a magnetic disk.

A communication unit 54 connects wirelessly or using a wired cable to transmit and receive a video signal and an audio signal. The communication unit 54 can also connect to a wireless local area network (LAN) and the Internet. The communication unit 54 can transmit images captured by the imaging units 22 (including through images) and images recorded on the recording medium 200, and can receive image data and other various types of information from external devices.

An orientation detection unit 55 detects the orientation of the smartphone 100 with respect to the direction of gravity. Whether the images captured by the imaging units 22 are ones captured with the smartphone 100 held landscape or ones captured with the smartphone 100 held portrait can be determined based on the orientation detected by the orientation detection unit 55. The system control unit 50 can add direction information based on the orientation detected by the orientation detection unit 55 to the image files of the images captured by the imaging unit 22, or record rotated images. An acceleration sensor, a gyro sensor, or the like can be used as the orientation detection unit 55.

A system timer 53 is a clocking unit that measures time used for various controls and the time of a built-in clock.

The down key 60, the up key 61, and an operation unit 70 are operating units for inputting various operation instructions to the system control unit 50.

Operating constants and variables of the system control unit 50 and programs read from a nonvolatile memory 56 are loaded into a system memory 52. The system control unit performs display control by controlling the memory 32, a digital-to-analog (D/A) converter 13, and the display unit 28, using a random access memory (RAM).

The nonvolatile memory 56 is a memory electrically erasable and recordable by the system control unit 50. For example, an electrically erasable programable read-only memory (EEPROM) or the like is used. The operating constants of the system control unit 50, the programs, and the like are stored in the nonvolatile memory 56. As employed herein, the programs refer to ones for executing various flowcharts to be described below in the present exemplary embodiment.

The system control unit 50 includes at least one built-in processor, and controls the entire smartphone 100. Various processes of the present exemplary embodiment to be described below are implemented by executing the programs recorded in the nonvolatile memory 56 described above.

The operation unit 70 includes the touchscreen 70a capable of detecting a touch operation, and a switch for switching to a silent mode. The up key 61, the down key 60, and the power switch 72 are also included in the operation unit 70.

The memory 32 serves also as an image display memory (video memory). The D/A converter 13 converts image display data stored in the memory 32 into an analog signal and supplies the analog signal to the display unit 28. The image data for display written to the memory 32 is thus displayed on the display unit 28 via the D/A converter 13. The display unit 28 provides display based on the analog signal from the D/A converter 13 on a display device such as a liquid crystal display (LCD). The digital signal once A/D-converted by the A/D converter 23 and accumulated in the memory 32 is analog-converted by the D/A converter 13 and transferred to and displayed on the display unit 28 in succession, whereby the display unit 28 can function as an electronic viewfinder and provide through image display (live view display).

Next, FIGS. 3A, 3B, 4A, and 4B illustrate diagrams for describing the imaging angles of view, focal lengths, and display magnifications of the respective lens units of the smartphone 100. FIGS. 3A and 3B describe a case where an out-camera that is the first side includes super-wide-angle, wide-angle, and standard lenses, and an in-camera that is the second side includes wide-angle and standard lenses.

FIG. 3A illustrates the lenses included in the lens units including the lens units at the first side (out-camera) and the lens units at the second side (in-camera). Of the lens units at the first side, the super-wide-angle lens that is the lens unit 205 has a focal length of 10 mm and an imaging angle of view of 130°. The wide-angle lens that is the lens unit 204 has a focal length of 20 mm and an imaging angle of view of 80°. The standard lens that is the lens unit 203 has a focal length of 30 mm and an imaging angle of view of 60°. Of the lens units at the second side, the wide-angle lens that is the lens unit 202 has a focal length of 15 mm and an imaging angle of view of 110°. The standard lens that is the lens unit 201 has a focal length of 25 mm and an imaging angle of view of 70°.

Of the lens units at the first side, the lens unit 205 captures an image with the imaging angle of view of 130°. If an instructed imaging angle of view is less than 130° and greater than 80°, the imaging angle of view is narrowed by electronic zoom. If the imaging angle of view reaches 80°, the imaging is switched to that using the lens of the lens unit 204. The lens unit 204 captures an image with the angle of view of 80°. If the instructed angle of view is less than 80° and greater than 60°, the imaging angle of view is narrowed by electronic zoom. If the instructed angle of view reaches 60°, the imaging is switched to that using the lens of the lens unit 203. A method for instructing the imaging angle of view will be described below. The user can change the angle of view of an image to be captured by switching the lenses. If instructions to change the angle of view are issued by the user, electronic zoom is thus used and the lens unit to capture an image is switched at timing when an instruction to change the angle of view to an imaging angle of view at which the next lens unit can capture an image is issued. Similarly, in the case of the second side, the lens unit 202 captures an image with the imaging angle of view of 110°. If the instructed imaging angle of view is less than 110° and greater than 70°, the imaging angle of view is narrowed by electronic zoom. The image captured with the instructed angle of view (image captured via the lens based on the instructed angle of view) is displayed on the display unit 28. If the instructed imaging angle of view reaches 70°, the imaging is switched to that using the lens of the lens unit 201. In the present exemplary embodiment, the lenses do not need to be single-focus lenses, and may be configured so that their lens positions can be moved for optical zoom.

FIG. 3B illustrates a diagram for describing the switching of the lens units at the first side in the case where the lens units are capable of optical zoom. Of the lens units at the first side, the lens unit 205 captures an image with the imaging angle of view of 130°. If the instructed imaging angle of view is less than 130°, optical zoom is first performed by moving the lens position. If the instructed imaging angle of view reaches 95°, the imaging angle of view is narrowed by electronic zoom. If the imaging angle of view reaches 80°, the imaging is switched to that using the lens of the lens unit 204. Moreover, if the instructed imaging angle of view is less than 80°, the imaging angle of view is changed using optical zoom. If the instructed imaging angle of view is less than 70°, electronic zoom is performed. If the instructed imaging angle of view reaches 60°, the lens unit 203 is used to capture an image. If the instructed imaging angle of view is less than 60°, electronic zoom is performed using the lens unit 203. The lenses of the in-camera that is the second side may include only single-focus lenses while the lenses of the out-camera that is the first side are configured to be capable of optical zoom. In the cases of both FIG. 3A and FIG. 3B, the timing to switch the lens unit to capture an image does not necessarily need to be the same when the imaging angle of view is reduced and when the imaging angle of view is increased. The timing to switch the lens unit to capture an image may be changed to reduce the effect on the captured image depending on the imaging mode and the imaging situation.

Figure 4A:
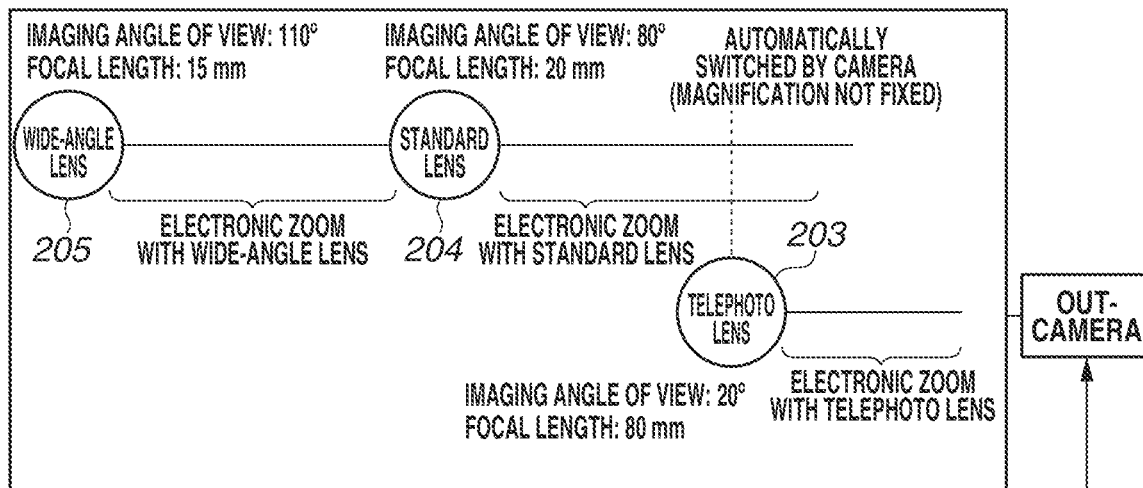
FIG. 4A is a diagram for describing the lens units of the smartphone 100 according to the present exemplary embodiment.
Figure 4B:
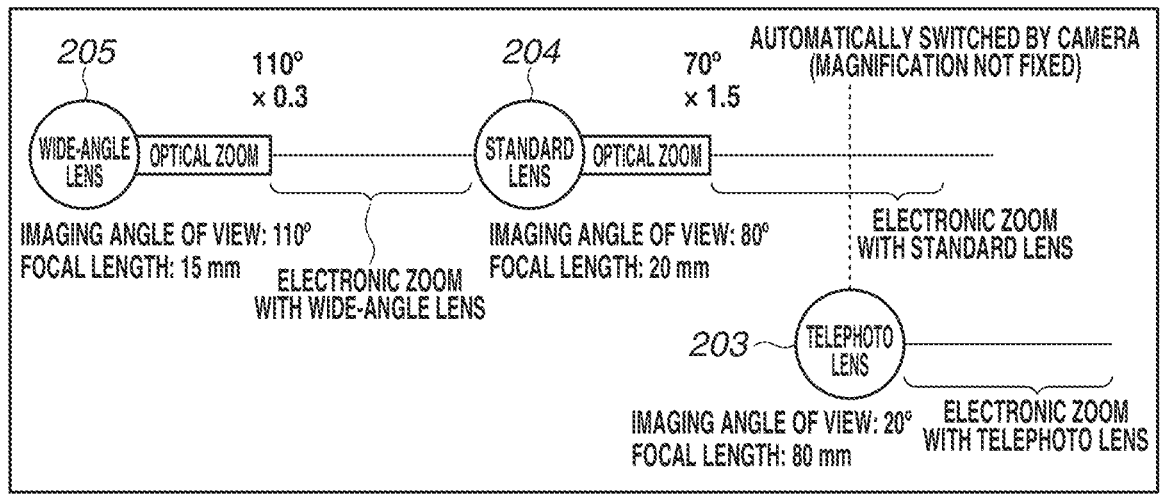
FIG. 4B is a diagram for describing the lens units of the smartphone 100 according to the present exemplary embodiment.

FIGS. 4A and 4B describe a case where the out-camera that is the first side includes wide-angle, standard, and telephoto lenses, and the in-camera that is the second side includes wide-angle and standard lenses.

FIG. 4A illustrates the lenses included in the lens units including the lens units at the first side (out-camera) and the lens units at the second side (in-camera). Of the lens units at the first side, the wide-angle lens that is the lens unit 205 has a focal length of 15 mm and an imaging angle of view 110°. The standard lens that is the lens unit 204 has a focal length of 20 mm and an imaging angle of view of 80°. The telephoto lens that is the lens unit 203 has a focal length of 80 mm and an imaging angle of view of 20°. Of the lens units at the second side, the wide-angle lens that is the lens unit 202 has a focal length of 20 mm and an imaging angle of view 110°. The standard lens that is the lens unit 201 has a focal length of 30 mm and an imaging angle of view of 70°.

Of the lens units at the first side, the lens unit 205 captures an image with the imaging angle of view of 110°. If the instructed imaging angle of view is less than 110° and greater than 80°, the imaging angle of view is narrowed by electronic zoom. If the imaging angle of view reaches 80°, the imaging is switched to that using the lens of the lens unit 204. Moreover, if the lens unit 204 captures an image with the imaging angle of view of 80° and the instructed imaging angle of view is less than 80° and greater than 20°, the imaging angle of view is narrowed using electronic zoom. Note that the timing to switch to the telephoto lens does not necessarily need to be when the instructed imaging angle of view becomes 20°. If the instructed imaging angle of view reaches 20°, the imaging is switched to that using the lens of the lens unit 203. A method for instructing the imaging angle of view will be described below. If the user thus issues instructions to change the angle of view, electronic zoom is used and the lens unit to capture an image is switched at timing when an instruction for an imaging angle of view at which the next lens unit can capture an image is issued. Similarly, in the case of the second side, the lens unit 202 captures an image with the imaging angle of view of 110°. If the instructed imaging angle of view is less than 110° and greater than 70°, the imaging angle of view is narrowed by electronic zoom. If the instructed imaging angle of view reaches 70°, the imaging is switched to that using the lens of the lens unit 201. In the present exemplary embodiment, the lenses do not need to be single-focus lenses, and may be configured so that the lens positions can be moved for optical zoom.

FIG. 4B illustrates a diagram for describing the switching of the lens units at the first surface in the case where the lens units are capable of optical zoom. Of the lens units at the first side, the lens unit 205 captures an image with the imaging angle of view of 130°. If the instructed imaging angle of view is less than 130°, optical zoom is first performed by moving the lens position. If the instructed imaging angle of view reaches 110°, the imaging angle of view is narrowed by electronic zoom. If the imaging angle of view reaches 80°, the imaging is switched to that using the lens of the lens unit 204. Moreover, if the instructed imaging angle of view is less than 80°, the imaging angle of view is changed using optical zoom. If the instructed imaging angle of view is less than 70°, electronic zoom is performed. If the instructed imaging angle of view reaches 20°, the lens unit 203 is used to capture an image. If the instructed imaging angle of view is less than 20°, electronic zoom is performed using the lens unit 203. The lenses of the in-camera that is the second side may include only single-focus lenses while the lenses of the out-camera that is the first side are configured to be capable of optical zoom. In the cases of both FIG. 4A and FIG. 4B, the timing to switch the lens unit to capture an image does not necessarily need to be the same when the imaging angle of view is reduced and when the imaging angle of view is increased. The timing to switch the lens unit to capture an image may be changed to reduce the effect on the captured image depending on the imaging mode and the imaging condition.

Figure 5A:
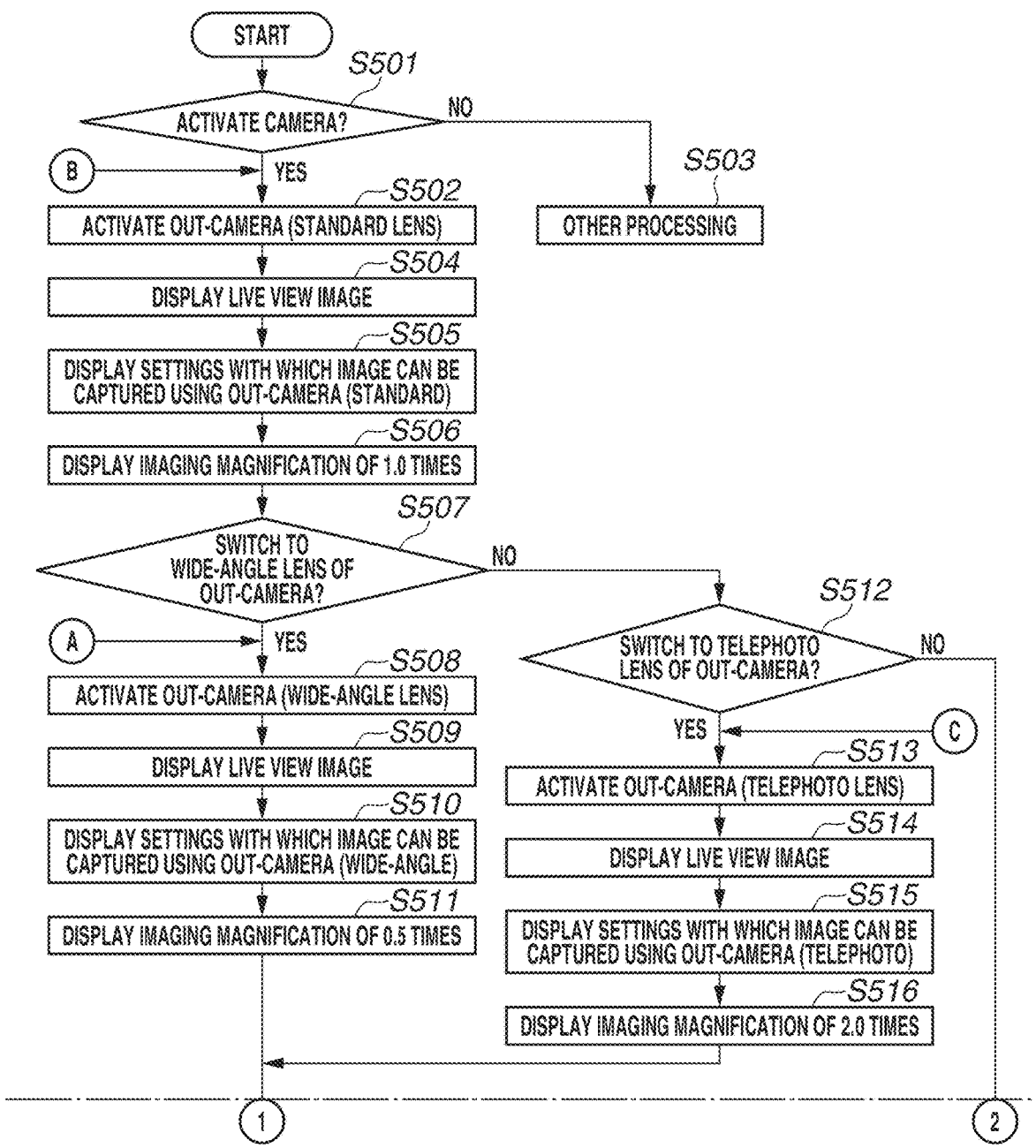
FIGS. 5A and 5B are a flowchart illustrating imaging control processing according to the present exemplary embodiment.

Next, imaging control processing according to the present exemplary embodiment will be described with reference to the flowcharts of FIGS. 5 and 6. This processing is implemented by loading a program recorded in the nonvolatile memory 56 into the system memory 52 and executing the program by the system control unit 50. The processing is started when the smartphone 100 is powered on. The imaging control processing of FIGS. 5 and 6 is predicated on the case where the out-camera that is the first side includes wide-angle, standard, and telephoto lenses, and the in-camera that is the second side includes wide-angle and standard lenses. In other words, the description will be given on the assumption that the lens units illustrated in FIG. 4A are disposed on the smartphone. However, this is not restrictive.

In step S501, the system control unit 50 determines whether an instruction to activate a camera function is issued. The instruction to activate the camera function can be issued by touching a camera item displayed on the display unit 28. If the instruction to activate the camera function is determined to be issued, the processing proceeds to step S502. If not, the processing proceeds to step S503.

In step S502, the system control unit 50 activates the standard lens of the out-camera at the first side, i.e., the camera of the lens unit 204. In other words, the activation of the camera function activates the out-camera. As will be described below, the camera at the second side, i.e., the in-camera can be switched after the activation of the out-camera.

In step S503, the system control unit 50 performs other processing. Examples of the other processing include playback of images obtained via the lens units 201 to 205, Internet browsing, and image editing.

In step S504, the system control unit 50 displays captured images obtained via the lens unit 204 on the display unit 28 in succession (live view image).

Figure 6A:
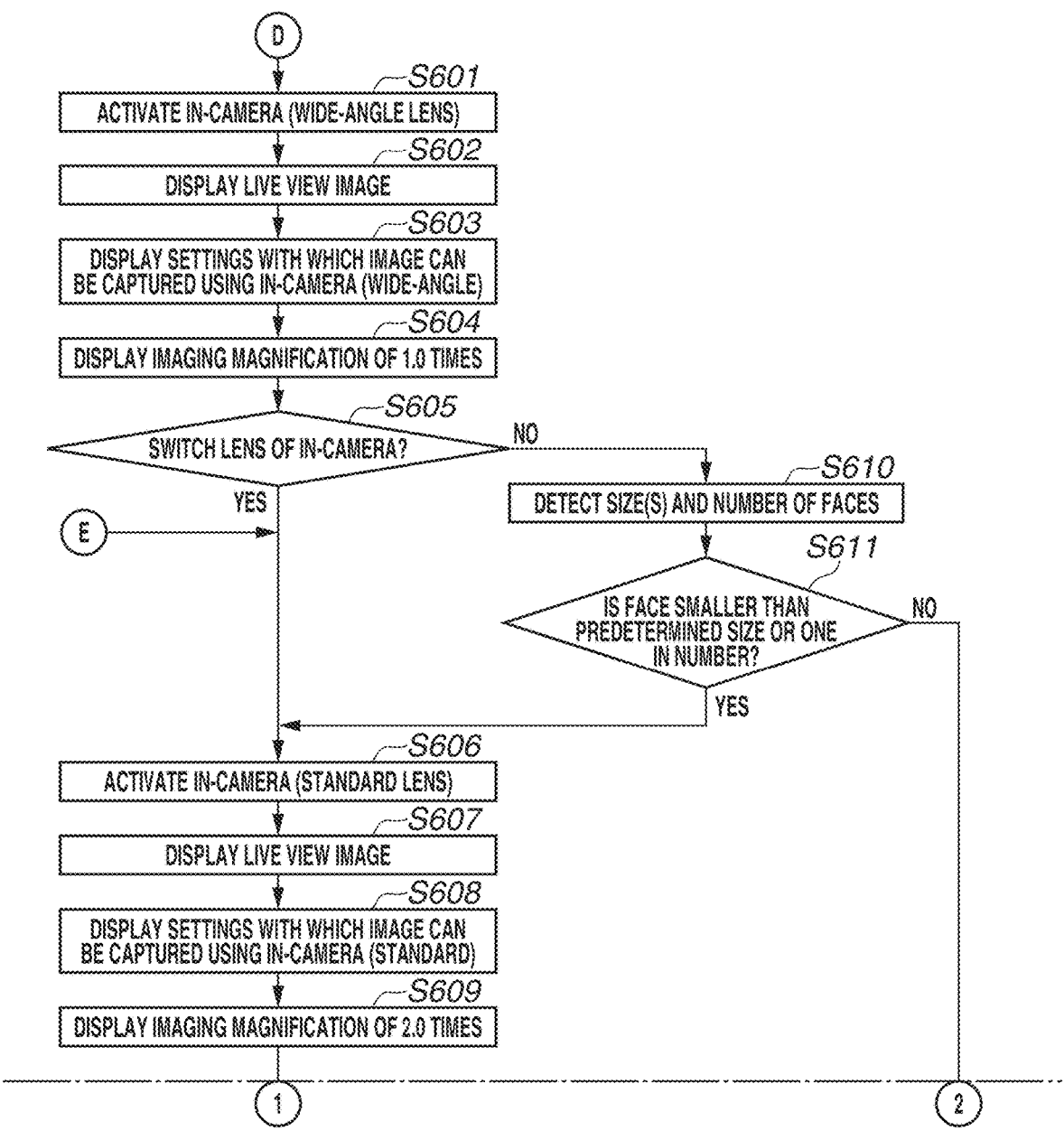
FIGS. 6A and 6B are a flowchart illustrating in-camera imaging control processing according to the present exemplary embodiment.
Figure 6B:
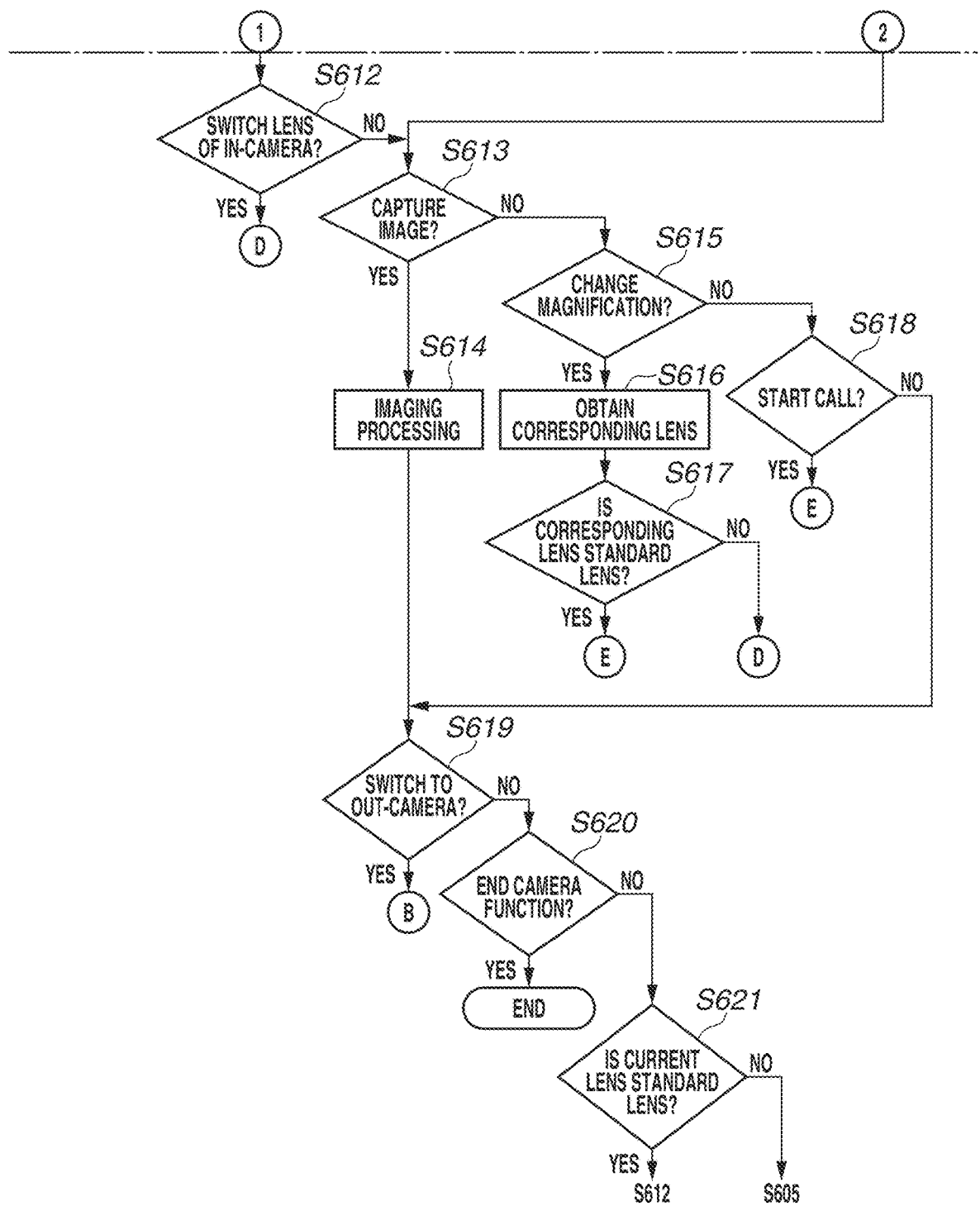
Figure 7A:
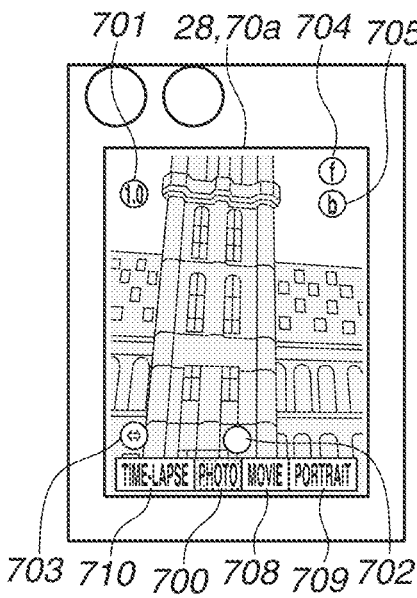
FIG. 7A is a diagram illustrating an example of display in the imaging control processing.

In step S505, the system control unit 50 displays settings with which an image can be captured using the standard lens (lens unit 204). FIGS. 7A to 7K illustrate examples of display in the imaging control processing illustrated in FIGS. 5 and 6. FIG. 7A illustrates a display example of the display unit 28 when the out-camera is activated. An item 704 is an item for changing an aperture value. An item 705 is an item for changing a skin-beautifying effect. When an image including a person is captured using the standard lens of the out-camera, the face in the image can be large and the skin-beautifying effect is therefore desirable. An item 702 illustrated in FIG. 7A is an item for issuing an imaging instruction. An item 703 is an item for switching to the imaging using the in-camera. Items 700 and 708 to 710 are items for switching to respective imaging modes. When the camera is activated, a picture mode represented by the item 700 is selected. The camera may be activated in a state where an imaging mode selected when the camera is activated by the user immediately before is selected. The item 708 represents a moving image mode, where a moving image can be captured. The item 709 represents a portrait mode, where an image of a main object can be captured with background objects blurred. The item 710 represents a time-lapse mode. In the time-lapse mode, images are captured at predetermined time intervals such as 2 sec and 5 sec, and the images are continuously played back.

In step S506, the system control unit 50 displays an imaging magnification of 1.0 times (once) on the display unit 28. As illustrated in FIG. 7A, an item 701 indicates the current imaging magnification, which is displayed as 1.0 times upon activation. More specifically, the imaging magnification of 1.0 times is displayed if the imaging angle of view during imaging using the standard lens illustrated in FIG. 4A is 80°. In other words, displaying the angle of view of the standard lens without electronic zoom as 1.0 times enables the user to recognize that the angle of view can be reduced and increased with reference to the angle of view currently displayed.

In step S507, the system control unit 50 determines whether an instruction to switch to the wide-angle lens is issued. If the instruction to switch to the wide-angle lens is determined to be issued, the processing proceeds to step S508. If not, the processing proceeds to step S512 and the system control unit 50 determines whether an instruction to switch to the telephoto lens is issued. If, in step S512, the instruction to switch to the telephoto lens is determined to be issued, the processing proceeds to step S513. If not, the processing proceeds to step S521. The instruction to switch to the wide-angle lens can be issued by a touch operation on the item 701 displayed on the display unit 28. For example, if a tap operation of touching the item 701 for a short time is made once, the wide-angle lens of the lens unit 205 is activated. If another tap operation is further made, the telephoto lens of the lens unit 203 is activated.

In step S508, the system control unit 50 activates the wide-angle lens of the out-camera at the first side, i.e., the camera of the lens unit 205.

In step S509, the system control unit 50 displays captured images obtained via the lens unit 205 on the display unit 28 in succession (live view image).

Figure 7B:
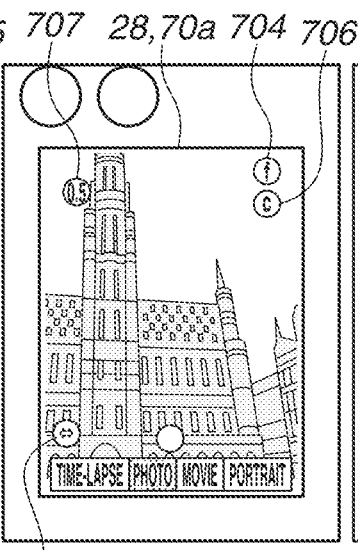
FIG. 7B is a diagram illustrating an example of display in the imaging control processing.

In step S510, the system control unit 50 displays settings with which an image can be captured using the wide-angle lens (lens unit 205). FIG. 7B illustrates a display example of the display unit 28 when the wide-angle lens of the out-camera is activated. The item 704 is the item for changing the aperture value. An item 706 is an item for executing processing for correcting distortion. Since the wide-angle lens of the out-camera may cause noticeable distortion in the captured image, the image processing for correcting distortion can be performed to make the distortion less noticeable. Other items similar to those of FIG. 7A are also displayed.

In step S511, the system control unit 50 displays an imaging magnification of 0.5 times on the display unit 28. As illustrated in FIG. 7B, an item 707 indicates the current imaging magnification, which shows that the display magnification is lower than with the standard lens, i.e., the imaging angle of view is wider. Specifically, if the imaging angle of view during imaging using the wide-angle lens illustrated in FIG. 4A is 110°, the imaging magnification of 0.5 times (less than once) is displayed. In other words, displaying the angle of view of the wide-angle lens without electronic zoom as 0.5 times enables the user to recognize that the angle of view currently displayed is greater than the standard.

In step S513, the system control unit 50 activates the telephoto lens of the out-camera at the first side, i.e., the camera of the lens unit 203.

In step S514, the system control unit 50 displays captured images obtained via the lens unit 203 on the display unit 28 in succession (live view image).

Figure 7C:
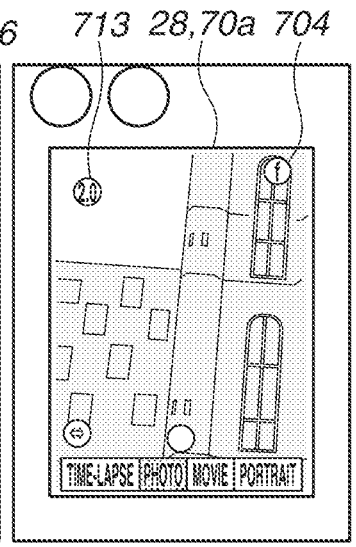
FIG. 7C is a diagram illustrating an example of display in the imaging control processing.
Figure 7D:
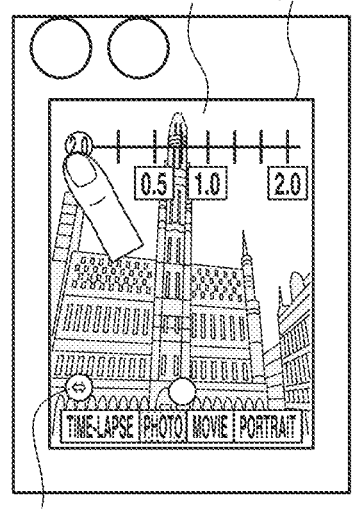
FIG. 7D is a diagram illustrating an example of display in the imaging control processing.

In step S515, the system control unit 50 displays settings with which an image can be captured using the telephoto lens (lens unit 203). FIG. 7C illustrates a display example of the display unit 28 when the telephoto lens of the out-camera is activated. The item 704 is the item for changing the aperture value. The items 705 and 706 displayed at the other imaging magnifications are not displayed for the telephoto lens of the out-camera. Other items similar to those of FIG. 7A are also displayed.

In step S516, the system control unit 50 displays an imaging magnification of 2.0 times on the display unit 28. As illustrated in FIG. 7C, an item 713 indicates the current imaging magnification, which shows that the display magnification is higher than with the standard lens, i.e., the imaging angle of view is narrower. Specifically, if the imaging angle of view during imaging using the telephoto lens illustrated in FIG. 4A is 30°, the imaging magnification of 2.0 times is displayed. In other words, displaying the angle of view of the wide-angle lens without electronic zoom as 2.0 times enables the user to recognize that the angle of view currently displayed is smaller than the standard.

The out-camera is often used to capture images with a person as an object or images of a landscape using the standard lens or the wide-angle lens. Images of distant objects are also captured using the telephoto lens. The out-camera includes three lenses i.e., more than those of the in-camera at the second side, with a wider range of angles of view where images can be captured. The user can thus recognize from the display of 1.0 times that a lens having a standard imaging magnification, i.e., other than the wide-angle or telephoto lens is being used, and can recognize that there are lenses capable of imaging with a wider angle of view or a more telescopic angle of view than that of the currently used lens. In other words, if the imaging magnification is displayed as 1.0 times in the state where there are three or more lenses, the user can easily recognize that the magnification can be changed to lower than 1.0 times or higher than 1.0 times.

In step S517, the system control unit 50 determines whether an instruction to switch to the standard lens is issued. The wide-angle lens can be switched to the standard lens by a touch operation on the item 713. Note that the touches on the items 701, 707, and 713 toggle to select the imaging magnifications in order. More specifically, the imaging magnifications toggle in order of 1.0 times, 0.5 times, and 2.0 times. However, the order is not limited thereto. Alternatively, the items 701, 707, and 713 may be constantly displayed with the live view image so that the user can select one of these. If the instruction to switch to the standard lens is determined to be issued, the processing proceeds to step S502. If not, the processing proceeds to step S518.

In step S518, the system control unit 50 determines whether an operation of changing the imaging magnification is made. To change the imaging magnification, the item 701 is long-pressed to display an item 711 illustrated in FIG. 7D. The imaging magnification can be changed by a touch-move on the bar of the item 711. The item 711 indicates settable imaging magnifications, and the user can set the imaging magnification by moving the touch position while viewing the live view screen. The item 711 is hidden when the user releases the touch. If the operation of changing the imaging magnification is determined to be made, the processing proceeds to step S519. If not, the processing proceeds to step S521.

In step S519, the system control unit 50 obtains the imaging magnification instructed by the touch operation on the item 711. In step S520, the system control unit 50 determines which the corresponding lens is, the telephoto lens, the standard lens, or the wide-angle lens. For example, if a magnification higher than 1.0 times and lower than 2.0 times is instructed by the touch operation on the item 711, the standard lens is selected. If a magnification lower than 1.0 times is selected, the wide-angle lens is selected. If a magnification higher than or equal to 2.0 times is selected, the telephoto lens is selected. If the standard lens is determined to be selected, the processing proceeds to step S502. If the wide-angle lens is determined to be selected, the processing proceeds to step S508. If the telephoto lens is determined to be selected, the processing proceeds to step S513.

In step S521, the system control unit 50 determines whether an imaging instruction is issued. The imaging instruction can be issued by a touch operation on the item 702. If the imaging instruction is determined to be issued, the processing proceeds to step S522. If not, the processing proceeds to step S523.

In step S522, the system control unit 50 performs imaging processing. The captured image is recorded on the recording medium 200.

In step S523, the system control unit 50 determines whether an instruction to switch to the in-camera is issued, i.e., an instruction to switch to the camera at the second side is issued. The instruction to switch to the in-camera can be issued by a touch operation on the item 703. If the instruction to switch to the in-camera is determined to be issued, the processing proceeds to in-camera imaging control processing illustrated in FIGS. 6A and 6B. If not, the processing proceeds to step S524.

In step S524, the system control unit 50 determines whether to end the camera function. An instruction to end the camera function can be issued by pressing the power switch 72, by an operation of scrolling up the display unit 28, or by a pinch operation as if to pinch the live view image. If the instruction to end the camera function is determined to be issued, the processing of FIGS. 5A and 5B ends. If not, the processing proceeds to step S525.

In step S525, the system control unit 50 determines whether the currently used lens is the standard lens. If the currently used lens is the standard lens, the processing proceeds to step S507. If not, the processing proceeds to step S517.

Figure 5B:
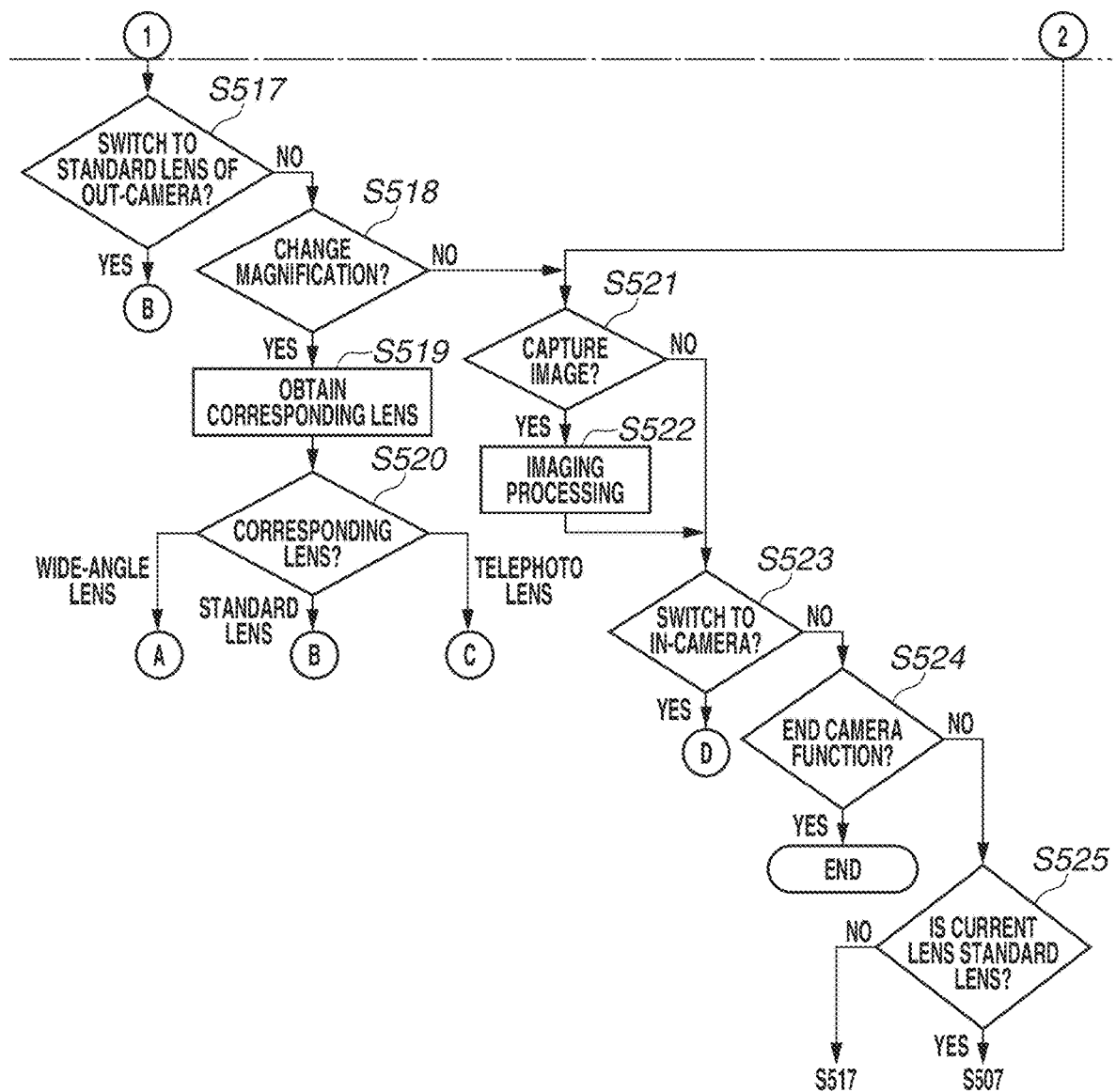

Next, the in-camera imaging control processing according to the present exemplary embodiment will be described with reference to FIGS. 6A and 6B. The processing is started if the determination in step S523 of FIG. 5B is yes.

In step S601, the system control unit 50 activates the wide-angle lens of the in-camera at the second side, i.e., the camera of the lens unit 202. In other words, if the instruction to activate the in-camera is issued, the wide-angle camera is initially activated. Activating the wide-angle lens thus in the case where the instruction to activate the in-camera is issued saves the user who wants to capture an image on the wide-angle side making an operation of changing the standard lens to a wider angle of view. Moreover, the activation at the wide-angle end enables the user to recognize the range beyond which the angle of view is unable to be widened due to optical requirements. Since the wide-angle end, i.e., the maximum angle of view capable of imaging can be recognized upon activation of the in-camera, the user can easily examine up to what range an image can be captured and whether the imaging range should be narrowed.

In step S602, the system control unit 50 displays captured images obtained via the lens unit 201 on the display unit 28 in succession (live view image).

Figure 7E:
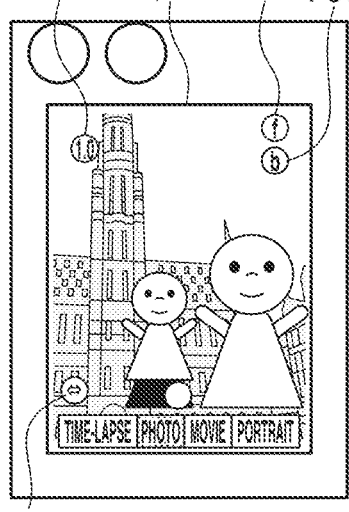
FIG. 7E is a diagram illustrating an example of display in the imaging control processing.

In step S603, the system control unit 50 displays settings with which an image can be captured using the wide-angle lens (lens unit 202). FIG. 7E illustrates a display example of the display unit 28 when the in-camera is activated. The item 704 is the item for changing the aperture value. The item 705 is the item for changing the skin-beautifying effect. When an image including a person is captured using the wide-angle lens of the in-camera, the face in the image can be large and the skin-beautifying effect is therefore desirable. While the picture mode represented by the item 700 is selected upon the activation of the in-camera, the camera may be activated in a state where an imaging mode selected when the camera is activated by the user immediately before is selected.

In step S604, the system control unit 50 displays an imaging magnification of 1.0 times on the display unit 28. As illustrated in FIG. 7E, an item 712 indicates the current imaging magnification, which is displayed as 1.0 times upon activation. More specifically, the imaging magnification is displayed as 1.0 times if the imaging angle of view during imaging using the wide-angle lens illustrated in FIG. 4B is 110°. In other words, displaying the angle of view of the wide-angle lens without electronic zoom as 1.0 times enables the user to recognize that the angle of view can be increased further with reference to the angle of view currently displayed.

In step S605, the system control unit 50 determines whether an instruction to switch to the standard lens is issued. If the instruction to switch to the standard lens is determined to be issued, the processing proceeds to step S607. If not, the processing proceeds to step S610. The instruction to switch to the standard lens can be issued by a touch operation on the item 712 displayed on the display unit 28. For example, if a tap operation of touching the item 712 for a short time is made once, the standard lens of the lens unit 201 is activated.

In step S606, the system control unit 50 activates the standard lens of the in-camera at the second side, i.e., the camera of the lens unit 201.

In step S607, the system control unit 50 displays captured images obtained via the lens unit 201 on the display unit 28 in succession (live view image).

Figure 7F:
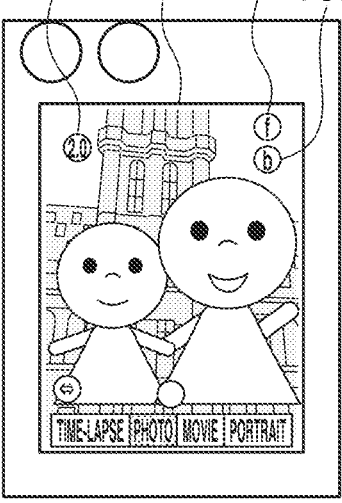
FIG. 7F is a diagram illustrating an example of display in the imaging control processing.

In step S608, the system control unit 50 displays settings with which an image can be captured using the standard lens (lens unit 201). FIG. 7F illustrates a display example of the display unit 28 when the standard lens of the in-camera is activated. The item 704 is the item for changing the aperture value. The item 705 is the item for changing the skin-beautifying effect. Other items similar to those of FIG. 7A are also displayed.

In step S609, the system control unit 50 displays an imaging magnification of 2.0 times on the display unit 28. As illustrated in FIG. 7F, the item 713 indicates the current imaging magnification, which shows that the imaging magnification is higher than 1.0 times, i.e., the imaging angle of view is narrowed. Specifically, if the imaging angle of view during imaging using the standard lens illustrated in FIG. 4A is 70°, the imaging magnification is displayed as 2.0 times. In other words, displaying the angle of view when the standard lens is used without electronic zoom as 2.0 times enables the user to recognize that the angle of view currently displayed can be increased. If the standard lens is in use and the imaging magnification is displayed as 1.0 times, the user can recognize that the magnification can be changed to above 1.0 times to narrow the current angle of view by electronic zoom. However, whether the current angle of view can be increased is intuitively difficult to understand. In other words, if the imaging magnification is displayed as 1.0 times, it can be seen that the angle of view can be narrowed using electronic zoom, but whether there is a lens capable of imaging with a wider angle of view than that of the currently used lens is difficult to understand. By contrast, displaying 2.0 times (magnification higher than 1.0 times) when there are a standard lens and a wide-angle lens and the standard lens is in use enables the user to recognize that the current angle of view is one 2.0 times magnified from a certain angle of view. The user can thus recognize that the angle of view can be changed to an unmagnified angle of view, i.e., that an image can be captured with a wider angle of view. On the other hand, displaying 1.0 times when there are a standard lens and a wide-angle lens and the wide-angle lens is in use enables the user to recognize that the imaging magnification can be changed to above 1.0 times at least by using electronic zoom. The user can thus recognize that the current imaging angle of view is capable of capturing an image with the wider angle of view in the changeable range of the angle of view.

In step S610, the system control unit 50 detects the size(s) of a face or faces being captured and the number of faces from the live view image.

In step S611, the system control unit 50 determines whether either one of the following conditions is satisfied or neither is satisfied: that the total area (size) of the face(s) obtained in step S610 is smaller than a predetermined size and that the number of faces is one. If either of the conditions is determined to be satisfied, the processing proceeds to step S606. If not, the processing proceeds to step S613. If the area of the region(s) including the face(s) in the entire live view image is smaller than a predetermined size (area), such as one-fifth or one-eighth of the entire live view image, the camera and the object(s) are likely to be at a sufficient distance even without wide-angle imaging. In such a case, the standard lens can be used to capture the user's face in a large size. On the other hand, suppose that the user's face is not at a sufficient distance. In such a case, if an image is captured using the standard lens and the angle of view is adjusted so that the hand holding the smartphone is not included, the image is difficult to be captured from a position sufficiently higher than the face. This can result in a captured image where the user's face looks large. The user is likely to capture an image using the standard lens if the camera and the object(s) are at a sufficient distance, and otherwise capture an image using the wide-angle lens. By determining the face size as in step S611 and, if the face area is small, automatically using the standard lens to capture an image, the image is likely to be able to be captured with an appropriate angle of view without the user switching the lenses.

If the number of faces is one, the object is relatively small with respect to the live view image. The face captured using the standard lens is therefore less likely to look large. Automatically switching to the standard lens thus reduces the user's operations.

In step S612, the system control unit 50 determines whether an instruction to switch to the wide-angle lens is issued. If the instruction to switch to the wide-angle lens is determined to be issued, the processing proceeds to step S601. If not, the processing proceeds to step S613. The instruction to switch to the wide-angle lens can be issued by a touch operation on the item 713 displayed on the display unit 28. For example, if a tap operation of touching the item 713 for a short time is made once, the wide-angle lens of the lens unit 202 is activated.

In step S613, the system control unit 50 determines whether an imaging instruction is issued. The imaging instruction can be issued by a touch operation on the item 702. If the imaging instruction is determined to be issued, the processing proceeds to step S614. If not, the processing proceeds to step S615.

In step S614, the system control unit 50 performs imaging processing. The captured image is recorded on the recording medium 200.

In step S615, the system control unit 50 determines whether an operation of changing the imaging magnification is made. To change the imaging magnification, the item 712 is long-pressed to display an item for changing the imaging magnification like the item 711 of FIG. 7D. The imaging magnification can be changed by a touch-move on the bar of the item. If the operation of changing the imaging magnification is determined to be made, the processing proceeds to step S616. If not, the processing proceeds to step S618.

In step S616, the system control unit 50 obtains the imaging magnification instructed by the touch operation on the item displayed in step S615. In step S617, the system control unit 50 determines whether the corresponding lens is the standard lens or the wide-angle lens. For example, if a magnification as high as or higher than 2.0 times is instructed by the touch operation on the item displayed in step S615, the standard lens is selected. If a magnification lower than 2.0 times is selected, the wide-angle lens is selected. If the standard lens is determined to be selected, the processing proceeds to step S606. If the wide-angle lens is determined to be selected, the processing proceeds to step S601.

In step S618, the system control unit 50 determines whether an instruction to activate a call function using the smartphone 100 is issued. The instruction to activate the call function may be able to be issued with the camera function activated or without the camera function activated. If the instruction to activate the call function is determined to be issued, the processing proceeds to step S606. If not, the processing proceeds to step S619.

In step S619, the system control unit 50 determines whether an instruction to switch to the out-camera is issued, i.e., whether an instruction to switch to the camera at the first side is issued. The instruction to switch to the out-camera can be issued by a touch operation on the item 703. If the instruction to switch to the out-camera is determined to be issued, the processing proceeds to step S502 of FIG. 5A. If not, the processing proceeds to step S620.

In step S620, the system control unit 50 determines whether to end the camera function. An instruction to end the camera function can be issued by pressing the power switch 72, by an operation of scrolling up the display unit 28, or by a pinch operation as if to pinch the live view image. If the instruction to end the camera function is determined to be issued, the processing of FIGS. 6A and 6B ends. If not, the processing proceeds to step S621.

In step S621, the system control unit 50 determines whether the currently used lens is the standard lens. If the currently used lens is the standard lens, the processing proceeds to step S612. If not, the processing proceeds to step S605.

Figure 7G:
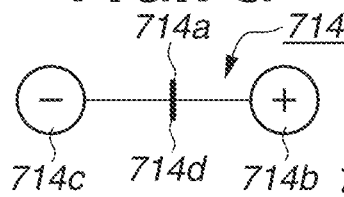
FIG. 7G is a diagram illustrating an example of display in the imaging control processing.
Figure 7H:
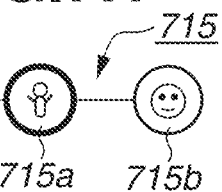
FIG. 7H is a diagram illustrating an example of display in the imaging control processing.
Figure 7I:
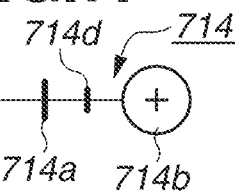
FIG. 7I is a diagram illustrating an example of display in the imaging control processing.
Figure 7J:
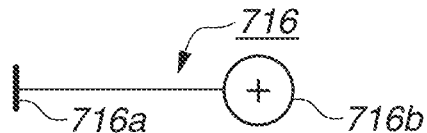
FIG. 7J is a diagram illustrating an example of display in the imaging control processing.
Figure 7K:
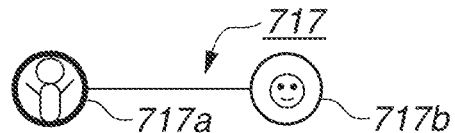
FIG. 7K is a diagram illustrating an example of display in the imaging control processing.

In the foregoing exemplary embodiment, the items for changing the imaging magnification are described to be indicated by numerals. However, the present exemplary embodiment is not limited thereto, and the following display may be employed. FIGS. 7G to 7K illustrate examples of the item for changing the imaging magnification. In the foregoing exemplary embodiment, the item 711 for changing the imaging magnification is described to be displayed if the item 701 or 712 is long-pressed. However, such an item may be constantly displayed with the live view image without a display instruction from the user. FIG. 7G illustrates an item 714 for changing the imaging magnification when the out-camera is activated. A line 714a of the item 714 indicates the middle position between a wide-angle end 714c and a telephoto end 714b. An instruction item 714d overlapping the line 714a can be moved, and the imaging magnification can be changed by moving the instruction item 714d. The actual angle of view at the center of the range of the angles of view between when the wide-angle end 714c is actually selected and when the telephoto end 714b is actually selected does not need to be 1.0 times in the imaging magnification. FIG. 7H illustrates an item 715 for changing the imaging magnification when the out-camera is activated. An item 715a included in the item 715 indicates that the standard lens is activated. The item 715a is surrounded by a thick frame to indicate that imaging is currently performed using the standard lens at the angle of view without electronic zoom. The imaging magnification can be changed by moving the touch position on the item 715. If an item 715b is selected, the telephoto lens is activated. If an item 715c is selected, the wide-angle lens is activated. If a position on the bar between the items is selected, the imaging magnification can be changed to an electrically zoomed one. FIG. 7I illustrates a display mode of the item 714 when the imaging magnification of the out-camera is changed to the telephoto side. The imaging magnification can be changed by moving the instruction item 714d to the telephoto side. FIG. 7J illustrates an item 716 for changing the imaging magnification when the in-camera is activated. An instruction item 716a is an item for changing the imaging magnification. The imaging magnification can be changed by changing the touch position on the item 716. An item 716b represents the telephoto end. The imaging magnification can be increased by moving the instruction item 716a up to the item 716b. Since the instruction item 716a is located at the wide-angle end when the in-camera is activated, the user can recognize that the current live view image is the most wide-angled. FIG. 7K illustrates an item 717 for changing the imaging magnification when the in-camera is activated. An item 717a corresponds to the imaging magnification when the wide-angle lens is activated, and the item 717b when the standard lens is activated. The imaging magnification can be changed by touching the item 717. Since the item 717a is selected when the in-camera is activated, the user can recognize that the current imaging magnification is at the wide-angle end.

According to the exemplary embodiment described above, the user, when capturing an image using the in-camera, can capture the image with a wide angle of view without an increase in the number of operations.

While in step S618 the in-camera is described to be switched to the standard lens when a call is started, the in-camera may also be switched to the standard lens upon activation of the in-camera in the following case. Suppose, for example, that the background scene behind a person is determined from a captured image and the background is found to be a wall in light color or the inside of a room. In such a case, the in-camera is switched to the standard lens since the user is likely to want to capture a large image of the person. On the other hand, if the background is determined to be a building or landscape, the wide-angle lens is activated since the user is likely to want to capture an image including the landscape or building.

Figure 8A:
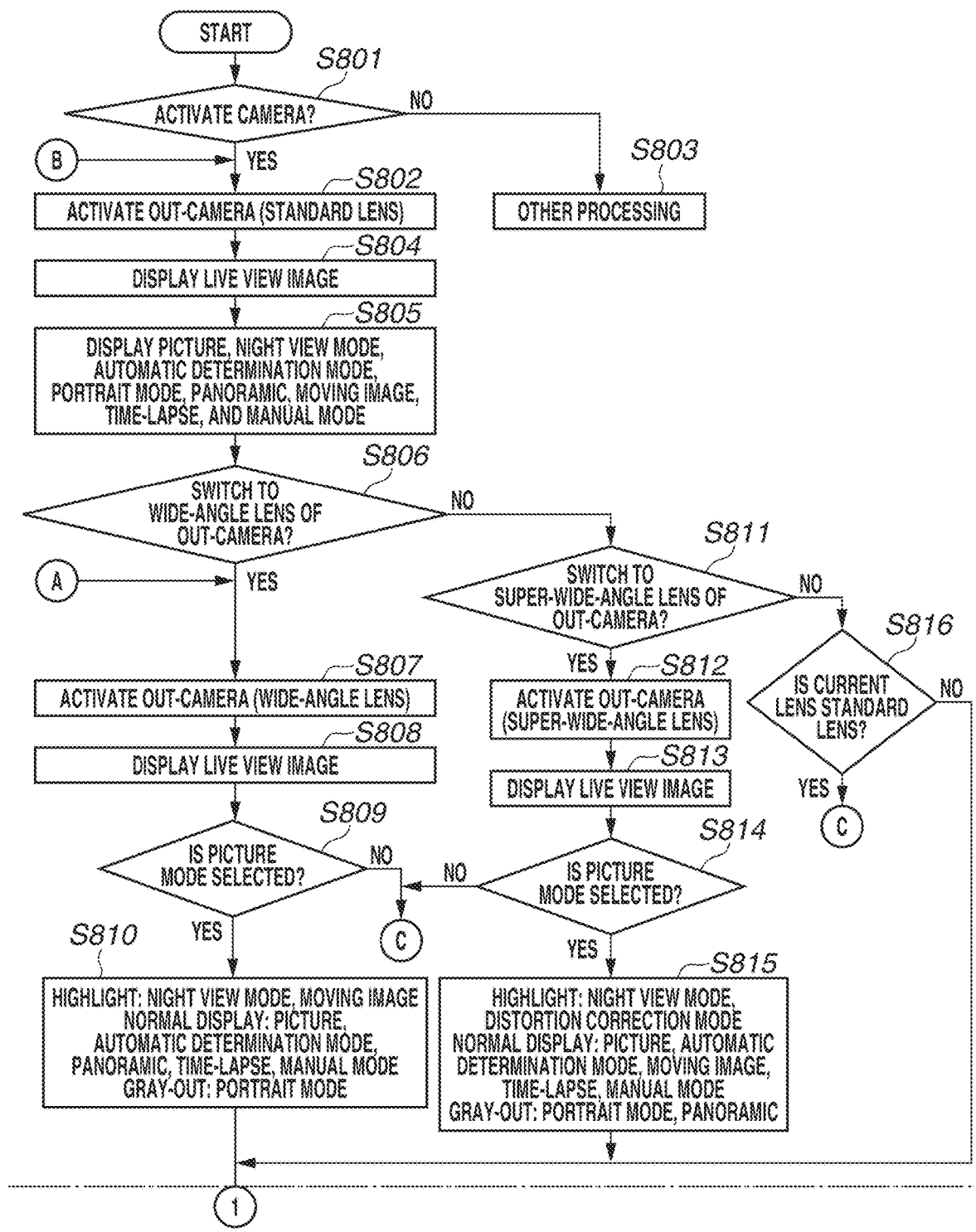
FIGS. 8A to 8C are a flowchart illustrating imaging mode selection processing according to the present exemplary embodiment.

Next, imaging mode selection processing according to the present exemplary embodiment will be described with reference to the flowcharts of FIGS. 8 and 9. The processing is implemented by loading a program recorded in the nonvolatile memory 56 into the system memory 52 and executing the program by the system control unit 50. The processing is started upon power-on of the smartphone 100. The imaging mode selection processing of FIGS. 8 and 9 is predicated on the case where the out-camera that is the first side includes super-wide-angle, wide-angle, and standard lenses, and the in-camera that is the second side includes wide-angle and standard lenses. In other words, the description will be given on the assumption that the lens units illustrated in FIG. 3A are disposed on the smartphone. However, this is not restrictive. In the imaging control processing described with reference to FIGS. 5 and 6, a change in the imaging magnification of the camera function is described. In the following flowcharts, a change in the imaging mode of the camera function will be described along with the control of a change in the imaging magnification. The exemplary embodiment of FIGS. 5 and 6 and that of FIGS. 8 and 9 may be carried out in combination.

In step S801, the system control unit 50 determines whether an instruction to activate the camera function is issued. The instruction to activate the camera function can be issued by touching the camera item displayed on the display unit 28. If the instruction to activate the camera function is determined to be issued, the processing proceeds to step S802. If not, the processing proceeds to step S803.

In step S802, the system control unit 50 activates the standard lens of the out-camera at the first side, i.e., the camera of the lens unit 203. In other words, the out-camera is activated when the camera function is activated. As will be described below, the camera at the second side, i.e., the in-camera can be switched after the activation of the out-camera.

In step S803, the system control unit 50 performs other processing. Examples of the other processing include playback of images obtained via the lens units 201 to 205, Internet browsing, and image editing.

In step S804, the system control unit 50 displays captured images obtained via the lens unit 203 on the display unit 28 in succession (live view image).

Figure 9:
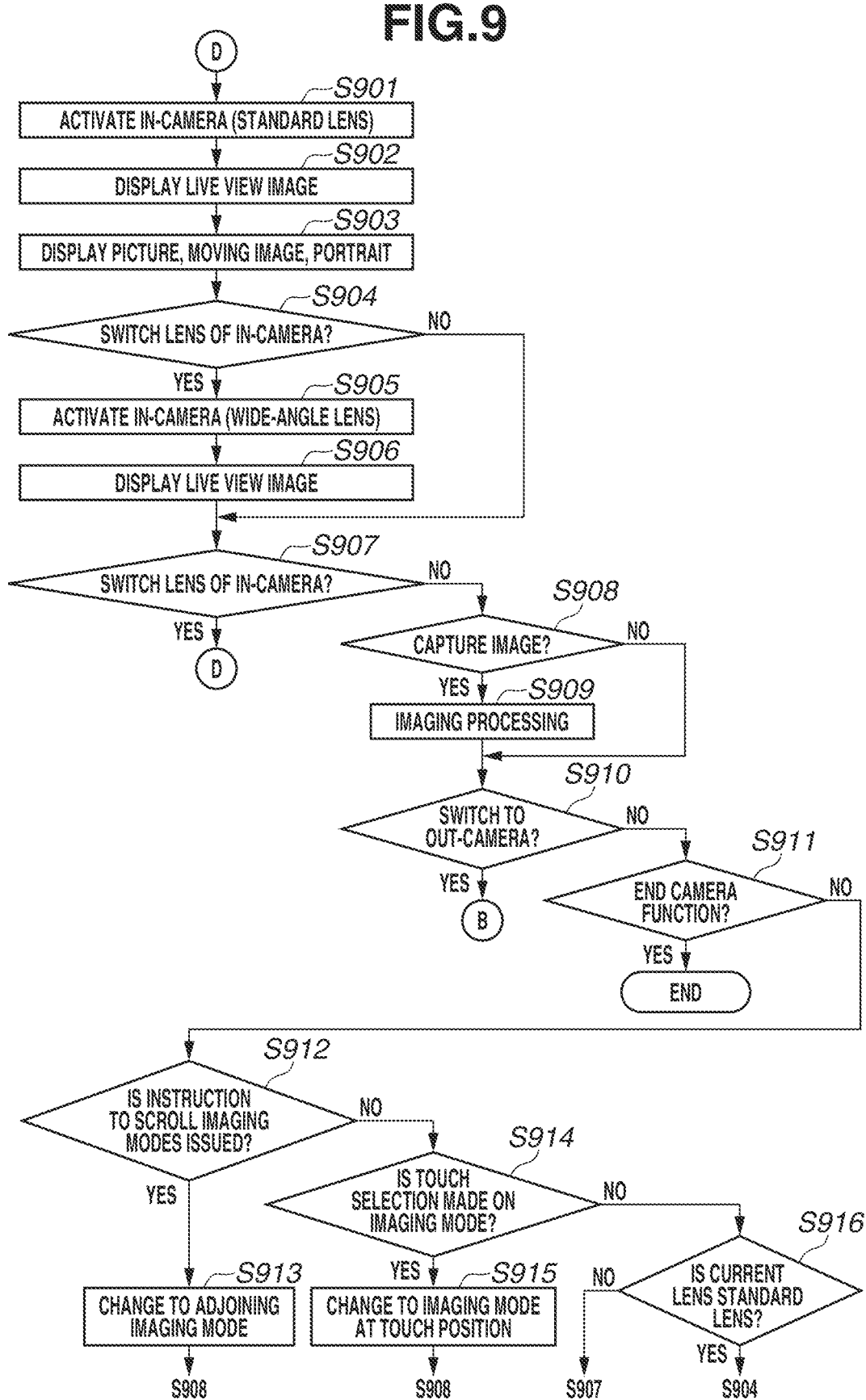
FIG. 9 is a flowchart illustrating in-camera imaging mode selection processing according to the present exemplary embodiment.
Figure 10A:
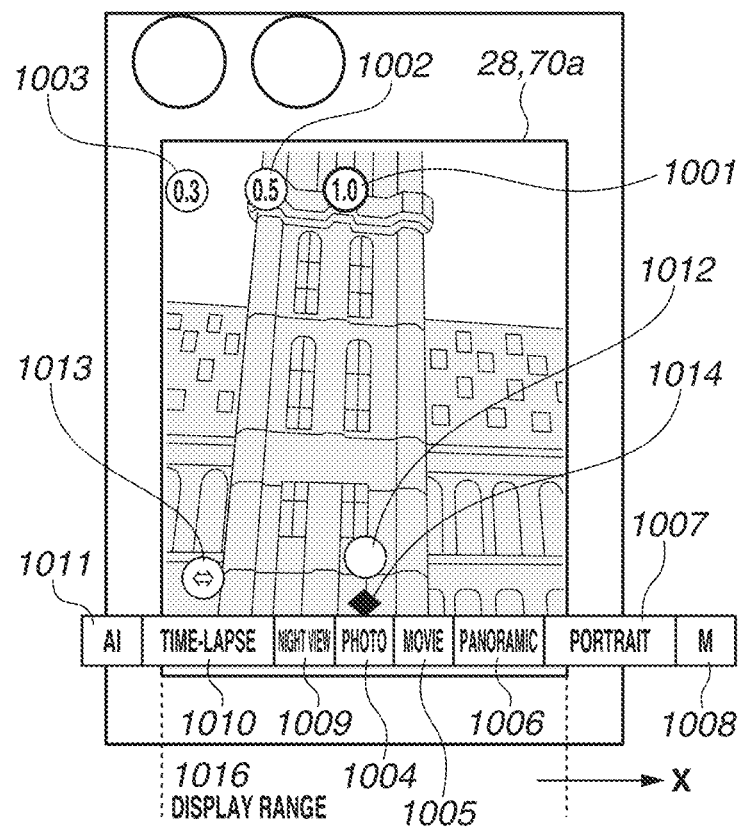
FIG. 10A is a diagram illustrating an example of display in the imaging mode selection processing.

In step S805, the system control unit 50 displays candidates for selectable imaging modes on the display unit 28. The candidates for the imaging modes include a picture mode, a night view mode, an automatic determination mode, a portrait mode, a panoramic mode, a moving image mode, a time-lapse mode, and a manual mode. FIGS. 10A to 10E and 11A to 11D illustrate examples of display to be described with reference to the flowcharts of FIGS. 8 and 9. FIG. 10A illustrates an example of an imaging screen displayed on the display unit 28 when the out-camera is activated. An item group displayed in a display range 1016 includes items 1004 to 1011 corresponding to the imaging modes, and some of the items are displayed on the display unit 28. In FIG. 10A, the items 1004 to 1006 and 1009 and part of the items 1007 and 1010 are displayed. The item 1004 represents the picture mode, the item 1005 the moving image mode, the item 1006 the panoramic mode, the item 1007 the portrait mode, the item 1008 the manual mode (M mode), and the item 1009 the night view mode. Moreover, the item 1010 represents the time-lapse mode, and the item 1011 the automatic determination mode (artificial intelligence [AI] mode). For the purpose of description, the items corresponding to the imaging modes that actually are hidden are also displayed in FIGS. 10A to 10D and 11B. When the camera function is activated, the picture mode is selected as the imaging mode. The corresponding item 1004 is displayed to adjoin a mark 1014 that indicates selection. The imaging mode corresponding to the item displayed directly below the mark 1014 is the selected imaging mode. The mark 1014 is displayed at the center in the transverse direction of the display unit 28 and remains unchanged in position even if the selected imaging mode is changed. When the item group is scrolled to change the imaging mode to be selected, the imaging modes displayed on the display unit 28 in the item group therefore change. An item 1001 indicates the current imaging magnification of 1.0 times, and is surrounded by a thicker line than an item 1002 (0.5 times) and an item 1003 (0.3 times) indicating other imaging magnifications are. Changing the display mode thus enables the user to recognize which imaging magnification is selected. The lens can be switched to one of the in-camera at the second side by selecting an item 1013. An item 1012 is an item for issuing an imaging instruction.

In step S806, the system control unit 50 determines whether an instruction to switch to the wide-angle lens is issued. If the instruction to switch to the wide-angle lens is determined to be issued, the processing proceeds to step S807. If not, the processing proceeds to step S811 and the system control unit 50 determines whether an instruction to switch to the super-wide-angle lens is issued. In step S811, if the instruction to switch to the super-wide-angle lens is determined to be issued, the processing proceeds to step S812. If not, the processing proceeds to step S816. The instruction to switch to the wide-angle lens can be issued by a touch operation on the item 1002 displayed on the display unit 28. The instruction to switch to the super-wide-angle lens can be issued by a touch operation on the item 1003 displayed on the display unit 28.

In step S807, the system control unit 50 activates the wide-angle lens of the out-camera at the first side, i.e., the camera of the lens unit 204.

In step S808, the system control unit 50 displays captured images obtained via the lens unit 204 on the display unit 28 in succession (live view image).

In step S809, the system control unit 50 determines whether the current imaging mode is the picture mode. If the current imaging mode is determined to be the picture mode, the processing proceeds to step S810. If not, the processing proceeds to step S824.

Figure 10B:
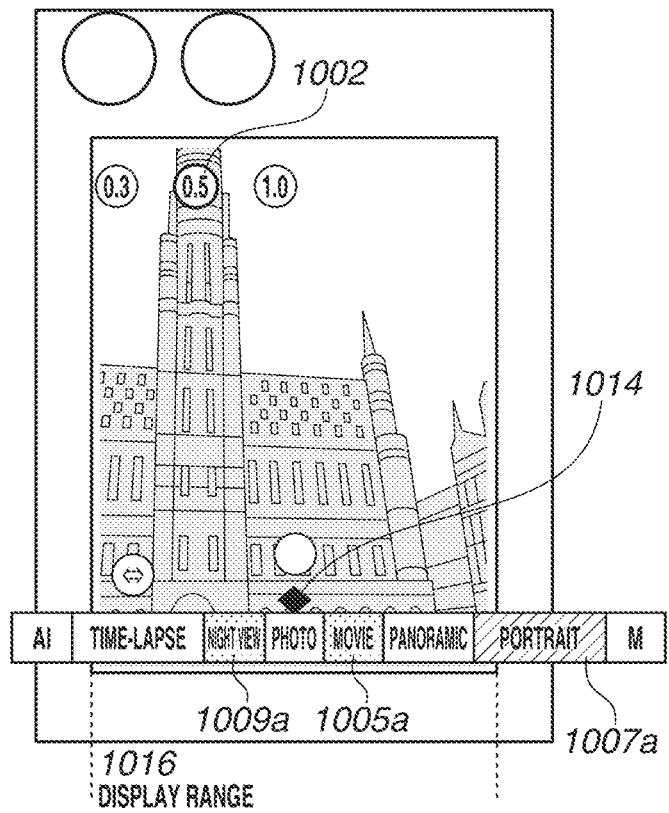
FIG. 10B is a diagram illustrating an example of display in the imaging mode selection processing.

In step S810, the system control unit 50 highlights the imaging modes suitable for imaging using the wide-angle camera, and grays out the unsuitable imaging modes. FIG. 10B illustrates a display example of the display unit 28 in the case of switching to the wide-angle lens in the picture mode. As illustrated in FIG. 10B, an item 1009a representing the night view mode and an item 1005a representing the moving image mode are displayed distinguishably from the other items (such as the items 1006 and 1010). To display an item distinguishably means, for example, to fill the item with conspicuous color, display the item larger than others, or display the item with slight vibrations. An item 1007a representing the portrait mode is grayed out to indicate that imaging will not be performed in the portrait mode when the wide-angle lens is selected. The display mode of the item 1007a may be other than gray-out. The item itself may be thinly displayed or displayed in small size. Alternatively, the item 1007a may be hidden. That is, if the wide-angle lens is selected in the picture mode, the user is likely to have a strong intention to capture an image using the wide-angle lens. Presenting the imaging modes suitable for the imaging using the wide-angle lens to the user in an easy-to-understand manner thus enables the user to switch the imaging modes quickly. Moreover, graying out the imaging modes not capable of imaging using the wide-angle lens enables the user to recognize that an image is no longer able to be captured with the angle of view using the wide-angle lens if the grayed-out imaging modes are selected. The wide-angle lens can record time-series changes within a wide range in the moving image mode. The wide-angle lens can capture an image including a plurality of buildings or a large building in the night view mode. The imaging modes suitable for the wide-angle lens are not limited to the foregoing.

In step S812, the system control unit 50 activates the super-wide-angle lens of the out-camera at the first side, i.e., the camera of the lens unit 205.

In step S813, the system control unit 50 displays captured images obtained via the lens unit 205 on the display unit 28 in succession (live view image).

In step S814, the system control unit 50 determines whether the current imaging mode is the picture mode. If the current imaging mode is determined to be the picture mode, the processing proceeds to step S815. If not, the processing proceeds to step S824.

Figure 10C:
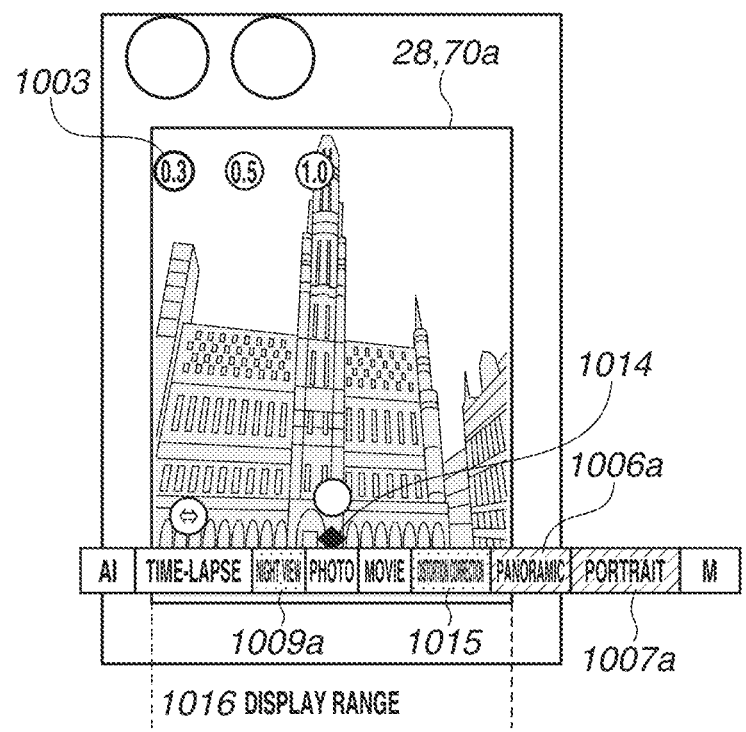
FIG. 10C is a diagram illustrating an example of display in the imaging mode selection processing.

In step S815, the system control unit 50 highlights the imaging modes suitable for imaging using the super-wide-angle camera, and grays out the unsuitable imaging modes. FIG. 10C illustrates a display example of the display unit 28 in the case of switching to the super-wide-angle lens in the picture mode. As illustrated in FIG. 10C, the item 1009a representing the night view mode and an item 1015 representing a distortion correction mode are displayed distinguishably from the other items (such as the items 1005 and 1010). The item 1007a representing the portrait mode and an item 1006*a* indicating the panoramic mode are grayed out to indicate that imaging will not be performed in the portrait mode or the panoramic mode when the super-wide-angle lens is selected. That is, if the super-wide-angle lens is selected in the picture mode, the user is likely to have a strong intention to capture an image using the super-wide-angle lens. Presenting the imaging modes suitable for the imaging using the super-wide-angle lens to the user in an easy-to-understand manner thus enables the user to switch the imaging modes quickly. Moreover, graying out the imaging modes not capable of imaging using the super-wide-angle lens enables the user to recognize that an image is no longer able to be captured with the angle of view using the super-wide-angle lens if the grayed-out imaging modes are selected. The imaging using the super-wide-angle lens may cause distortion near image edges, and an image can be captured in the distortion correction mode. In using the super-wide-angle lens, the user's recognition is therefore desirably facilitated that imaging in the distortion correction mode can be performed and is recommended. Moreover, imaging in the panoramic mode is not performed since images can be unable to be combined due to distortion occurring near image edges. In step S816, the system control unit 50 determines whether the current lens is the standard lens. If the currently used lens is determined to be the standard lens, the processing proceeds to step S824 to perform imaging mode switching processing for the case where all the imaging modes are selectable. If no in step S816, the processing proceeds to step S817 to perform imaging mode switching processing for the case where some of the imaging modes are not selectable.

In step S817, the system control unit 50 determines whether an instruction to scroll the item group indicating the imaging modes is issued by the user. If the instruction to scroll the item group indicating the imaging modes is determined to be issued, the processing proceeds to step S818. If not, the processing proceeds to step S819.

Figure 11A:
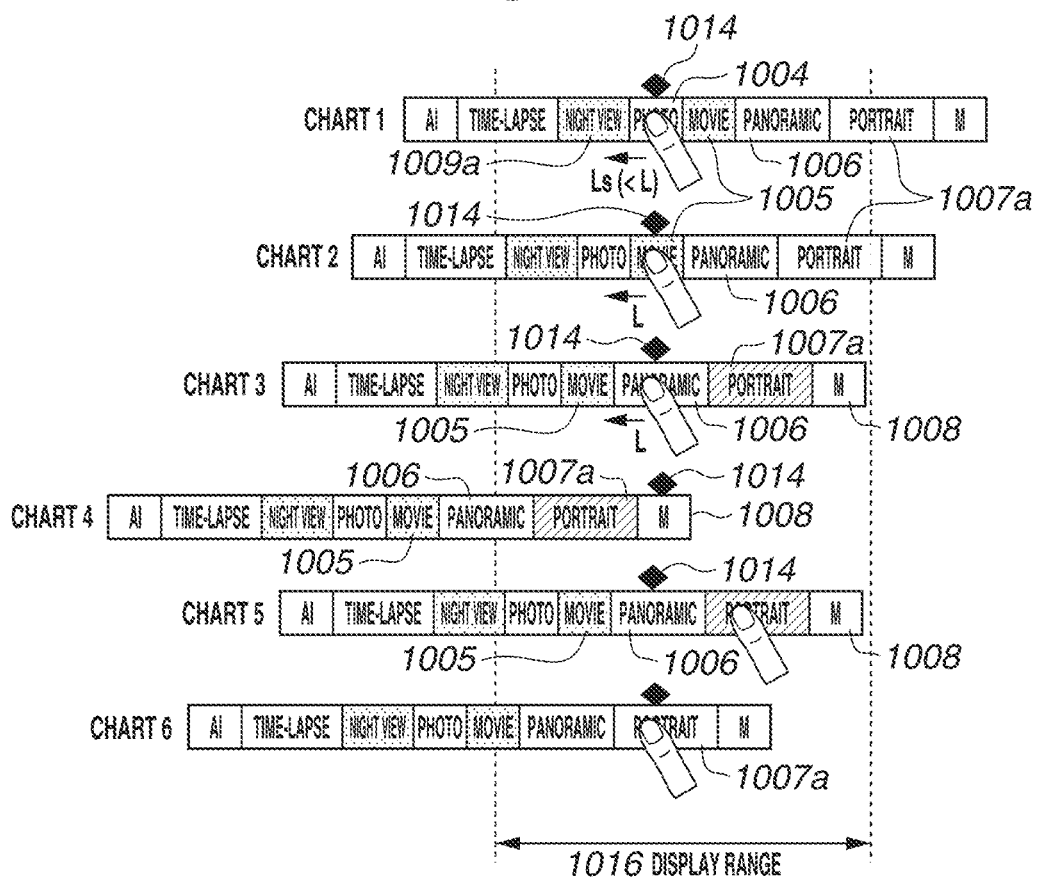
FIG. 11A is a diagram illustrating an example of display in the imaging mode selection processing.

In step S818, the system control unit 50 changes the imaging mode to a selectable imaging mode located closest to the currently selected one among the imaging modes in the scroll direction. FIG. 11A is a diagram for describing the selection of the imaging mode when the wide-angle lens is selected. As illustrated in Chart 2 of FIG. 11A, if the currently selected imaging mode is the moving image mode and the item group is scrolled by a distance L along the transverse direction of the display unit 28 to the left, the item 1006 (panoramic mode) that is on the right of the item 1005 and selectable is selected. As illustrated in Chart 1 of FIG. 11A, if the currently selected imaging mode is the picture mode and the item group is scrolled by a distance Ls less than the distance L to the left, the item 1005 is selected. The item 1005 corresponds to the moving image mode. The picture mode can be switched to the moving image mode, which is an imaging mode where imaging using the wide-angle lens is recommended, by a smaller amount of scroll than usual. As illustrated in Chart 3, if the panoramic mode is selected and a scroll instruction to the left is issued, the adjoining portrait mode would normally be selected. However, switching to the portrait mode interferes with the imaging using the wide-angle lens. The grayed-out item 1007 representing the portrait mode is therefore not selected (skipped) even if the item group is scrolled by the distance L to the left. The item 1008 representing the manual mode that is the selectable imaging mode located on the right of and closest to the item 1006 is then selected.

Figure 11B:
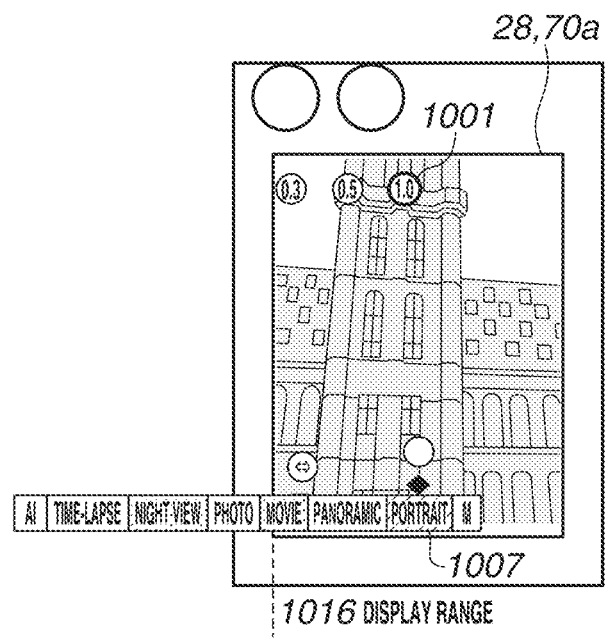
FIG. 11B is a diagram illustrating an example of display in the imaging mode selection processing.

In step S819, the system control unit 50 determines whether a touch selection is made on any one of the items representing the imaging modes. More specifically, the system control unit 50 determines whether an operation (tap operation) of touching any one of the items 1004 to 1011 and releasing the touch within a predetermined short time such as 0.5 sec or 0.2 sec without once moving the touch is made. If a touch selection is determined to be made, the imaging mode is switched even if an image is unable to be captured using the selected lens. The processing thus proceeds to step S820 to select the touched imaging mode. Chart 5 of FIG. 11 illustrates a state where the user is making a tap operation on the item 1007 corresponding to the portrait mode. While images are unable to be captured in the portrait mode with the wide-angle lens selected, the item 1007 can be tapped to switch to the state where the item 1007 is selected as in Chart 6, i.e., the portrait mode. FIG. 11B illustrates a display example of the display unit 28 after the portrait mode is selected. As illustrated in FIG. 11B, the imaging magnification indicated by the item 1001 is 1.0 times, which shows that the lens is switched to the standard lens.

In step S821, the system control unit 50 determines whether the imaging mode selected by the operation in step S819 is one where an image can be captured only using the standard lens. In other words, the system control unit 50 determines whether the imaging mode is one where an image is unable to be captured using the wide-angle lens or the super-wide-angle lens, like the portrait mode. If yes, the processing proceeds to step S802 to perform processing for switching to the standard lens. If no in step S821, the processing proceeds to step S822.

In step S822, the system control unit 50 determines whether the imaging mode selected by the operation in step S819 is one where an image can be captured using the wide-angle lens. In other words, the system control unit 50 determines whether the imaging mode is one where an image can be captured using the standard lens and the wide-angle lens and is unable to be captured only if the super-wide-angle lens is used, like the panoramic mode. Switching to the standard lens in the imaging mode where an image is unable to be captured using the super-wide-angle lens would result in a large change in the angle of view. The system control unit 50 thus determines whether an image can be captured using the wide-angle lens. If an image can be captured using the wide-angle lens, the processing proceeds to step S807 to switch to the wide-angle lens. This enables imaging in the user-selected imaging mode while preventing a large change in the angle of view. If no in step S822, the processing proceeds to step S823.

Figure 10D:
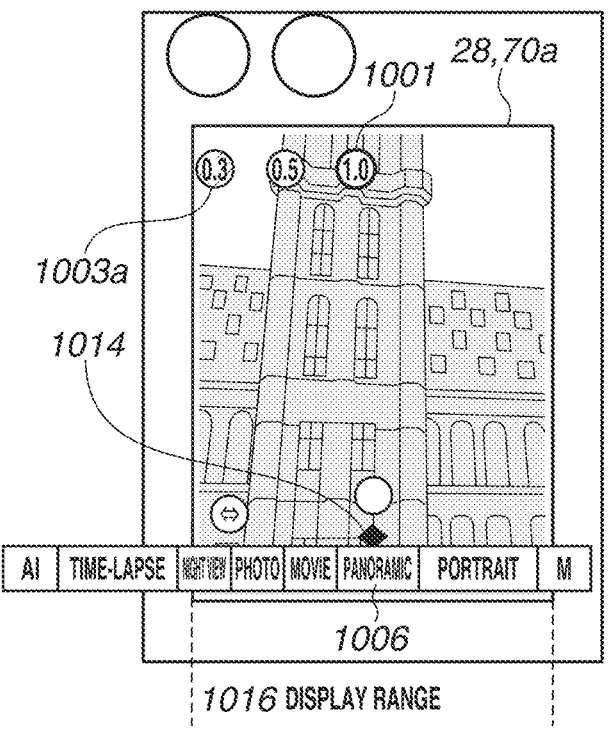
FIG. 10D is a diagram illustrating an example of display in the imaging mode selection processing.

In step S823, the system control unit 50 recognizably displays the lens or lenses selectable in the selected imaging mode. FIG. 10D illustrates a display example when the panoramic mode is selected. An item 1003*a* representing the super-wide-angle lens is grayed out. The item 1002 representing the wide-angle lens and the item 1001 representing the standard lens are displayed without being grayed out. The user can thus recognize that the super-wide-angle lens is not selectable in the panoramic mode.

In step S824, the system control unit 50 performs processing similar to that of step S817.

Figure 10E:
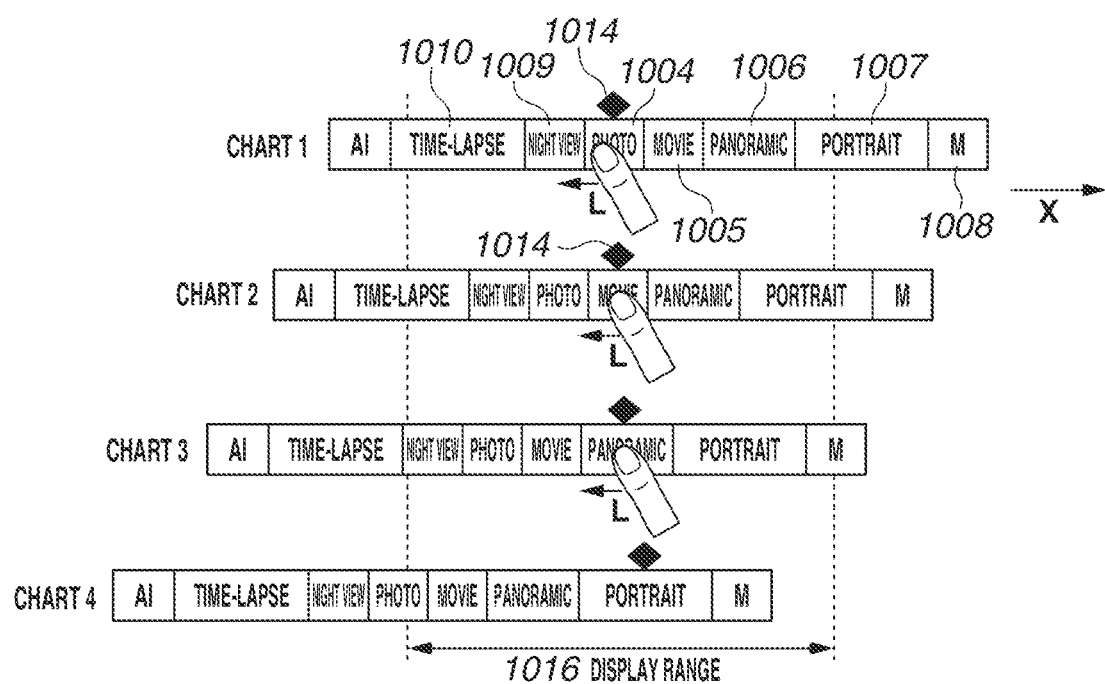
FIG. 10E is a diagram illustrating an example of display in the imaging mode selection processing.

In step S825, the system control unit 50 selects the item next to the one corresponding to the currently selected imaging mode based on the scroll direction each time a scroll instruction is issued. In step S818, an imaging mode that is selectable when the scroll operation is made is selected, and an imaging mode that is not selectable is not selected and skipped. By contrast, in step S825, the next imaging mode is selected each time the item group is scrolled by the distance L. FIG. 10E is a diagram for describing the switching of the imaging modes when the item group is scrolled by the distance L. In Charts 1 to 4, the item corresponding to the imaging mode that comes directly below the mark 1014 is switched to the next one on the right each time the user scrolls the item group to the left by the distance L. Since the display position of the mark 1014 on the display unit 28 remains unchanged, the items displayed within the range of the display unit are the time-lapse mode to the portrait mode in Chart 1, and change to the moving image mode to the manual mode in Chart 4.

The processing of steps S824 to S827 is the processing for the case where the selected lens is the standard lens or for a case where the lens is switched to the wide-angle or super-wide-angle lens in a mode other than the picture mode. In other words, any imaging mode can be selected for the standard lens, and there is no specific imaging mode that needs to be made less easy to select. If the user does not switch the standard lens selected upon activation to the wide-angle lens or the super-wide-angle lens, the user is also likely to intend to select a lens after selecting an imaging mode. All the imaging modes are therefore displayed in a parallel relationship (without highlighting or graying out some of the imaging modes) and without making some of the imaging modes less easy to select. The user who wants to select a lens after selecting an imaging mode can thus select the imaging mode and the lens with high operability.

In step S828, the system control unit 50 determines whether an imaging instruction is issued. The imaging instruction can be issued by a touch operation on the item 1012. If the imaging instruction is determined to be issued, the processing proceeds to step S829. If not, the processing proceeds to step S830.

In step S829, the system control unit 50 performs imaging processing. The captured image is recorded on the recording medium 200.

In step S830, the system control unit 50 determines whether an instruction to switch to the in-camera is issued. The instruction to switch to the in-camera, i.e., the second side can be issued by a touch operation on the item 1013. If yes in step S830, the processing proceeds to in-camera imaging mode selection processing of FIG. 9. If not, the processing proceeds to step S831.

In step S831, the system control unit 50 determines whether to end the camera function. An instruction to end the camera function can be issued by pressing the power switch 72, by an operation of scrolling up the display unit 28, or by a pinch operation as if to pinch the live view image. If the instruction to end the camera function is determined to be issued, the processing of FIGS. 8A to 8C ends. If not, the processing proceeds to step S832.

In step S832, the system control unit 50 determines whether an instruction to switch the out-camera to the standard lens is issued. The instruction to switch to the standard lens can be issued by a touch operation on the item 1001. If yes in step S832, the processing proceeds to step S802. If not, the processing proceeds to step S833.

In step S833, the system control unit 50 determines whether the currently selected lens is the standard lens. If the currently selected lens is determined to be the standard lens, the processing proceeds to step S806. If not, the processing proceeds to step S817.

Next, the in-camera imaging mode selection processing according to the present exemplary embodiment will be described with reference to the flowchart of FIG. 9. This processing is implemented by loading a program recorded in the nonvolatile memory 56 into the system memory 52 and executing the program by the system control unit 50. This processing is started if the determination of yes is made in step S830 of FIG. 8C.

In step S901, the system control unit 50 activates the standard lens of the in-camera. In other words, the system control unit 50 activates the standard lens of the in-camera at the second side, i.e., the camera of the lens unit 201.

In step S902, the system control unit 50 displays captured images obtained via the lens unit 201 on the display unit 28 in succession (live view image).

Figure 11C:
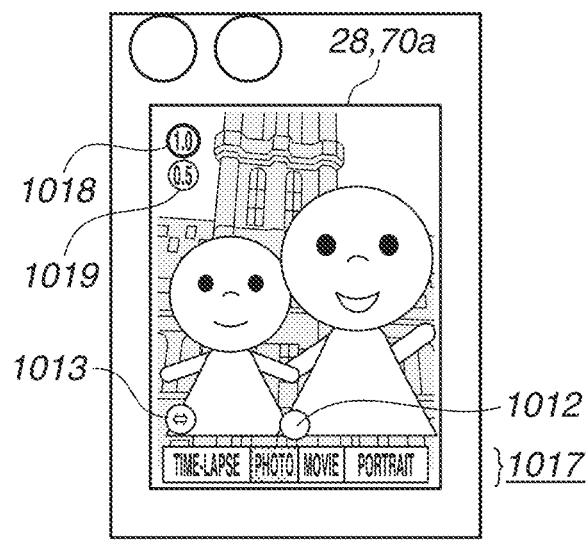
FIG. 11C is a diagram illustrating an example of display in the imaging mode selection processing.

In step S903, the system control unit 50 displays a group of items 1017 representing the time-lapse mode, the picture mode, the moving image mode, and the portrait mode on the display unit 28. FIG. 11C illustrates a display example when the standard lens is activated. When the in-camera is activated, the user is likely to capture an image with himself/herself as an object. The number of selectable imaging modes is thus limited compared to when the out-camera is selected.

In step S904, the system control unit 50 determines whether an instruction to switch the lens of the in-camera to the wide-angle lens is issued. The instruction to switch to the wide-angle lens can be issued by a touch operation on an item 1019. If yes in step S904, the processing proceeds to step S905. If not, the processing proceeds to step S907.

In step S905, the system control unit 50 activates the wide-angle lens of the in-camera. More specifically, the system control unit 50 activates the wide-angle lens of the in-camera at the second side, i.e., the camera of the lens unit 202.

Figure 11D:
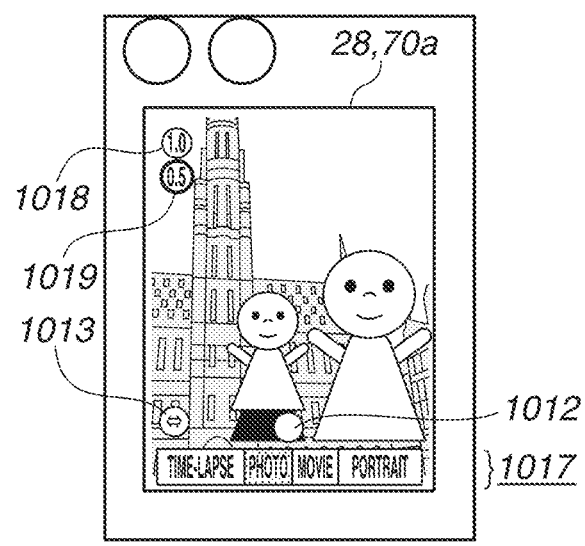
FIG. 11D is a diagram illustrating an example of display in the imaging mode selection processing.

In step S906, the system control unit 50 displays captured images obtained via the lens unit 202 on the display unit 28 in succession (live view image). FIG. 11D illustrates a display example of the display unit 28 when the wide-angle lens of the in-camera is activated. The in-camera includes the standard lens and the wide-angle lens, both of which can capture images in the same imaging modes. In the case of the in-camera, the selectable imaging modes are the same since the changeable range of the angle of view is not as wide as that of the out-camera. None of the imaging modes therefore needs to be made easier to select or less easy to select.

In step S907, the system control unit 50 determines whether an instruction to switch the lens of the in-camera to the standard lens is issued. The instruction to switch to the standard lens can be issued by a touch operation on an item 1018. If yes in step S904, the processing proceeds to step S905. If not, the processing proceeds to step S907.

In step S908, the system control unit 50 determines whether an imaging instruction is issued. The imaging instruction can be issued by a touch operation on the item 1012. If the imaging instruction is determined to be issued, the processing proceeds to step S909. If not, the processing proceeds to step S910.

In step S909, the system control unit 50 performs imaging processing. The captured image is recorded on the recording medium 200.

In step S910, the system control unit 50 determines whether an instruction to switch to the out-camera is issued. The instruction to switch to the out-camera (lens at the first side) can be issued by a touch operation on the item 1013. If the instruction to switch to the out-camera is determined to be issued, the processing proceeds to step S802 to activate the standard lens of the out-camera. If no in step S910, the processing proceeds to step S911.

In step S911, the system control unit 50 determines whether to end the camera function. An instruction to end the camera function can be issued by pressing the power switch 72, by an operation of scrolling up the display unit 28, or by a pinch operation as if to pinch the live view image. If the instruction to end the camera function is determined to be issued, the processing of FIG. 9 ends. If not, the processing proceeds to step S912.

Figure 8B:
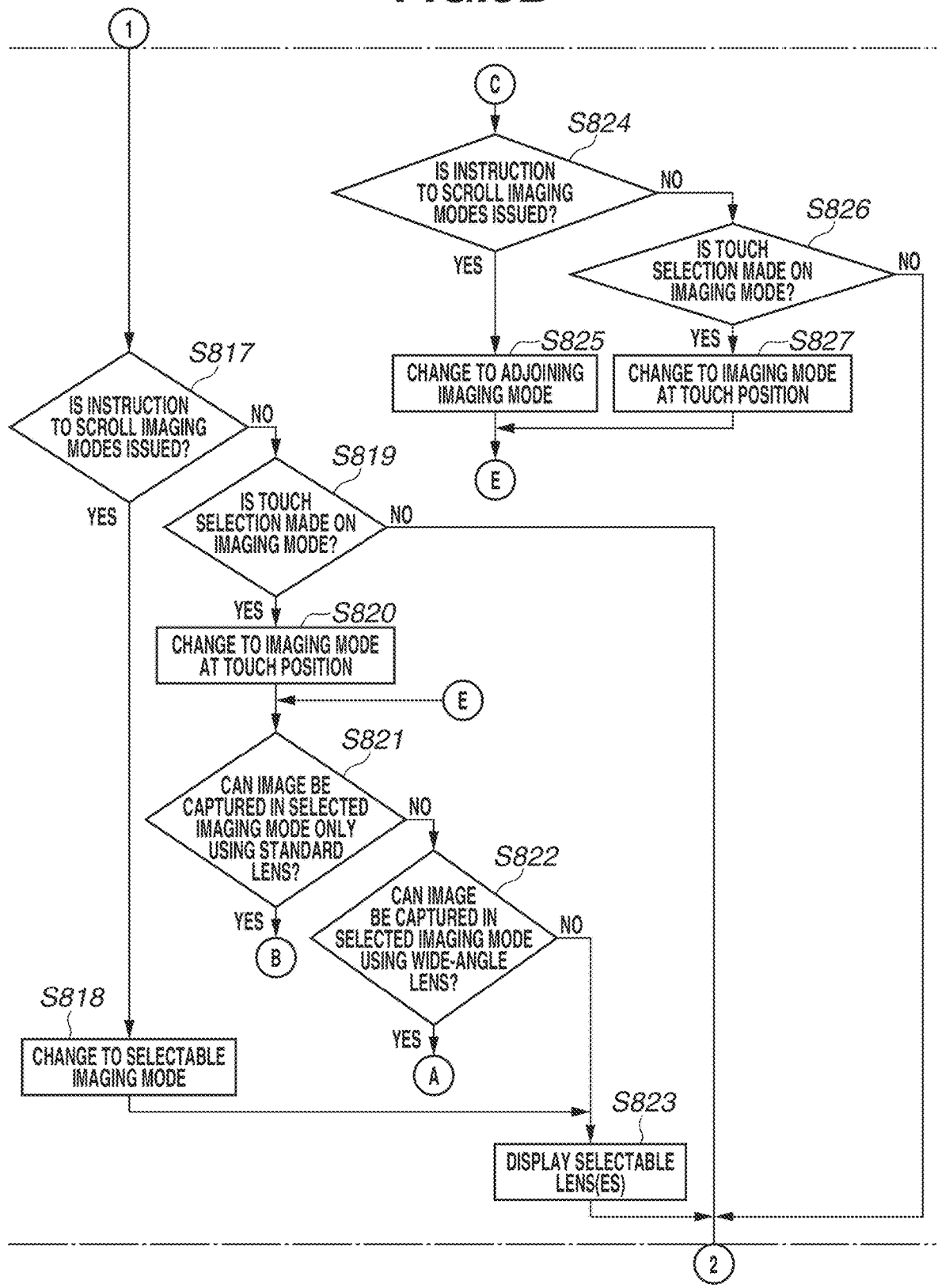
Figure 8C:
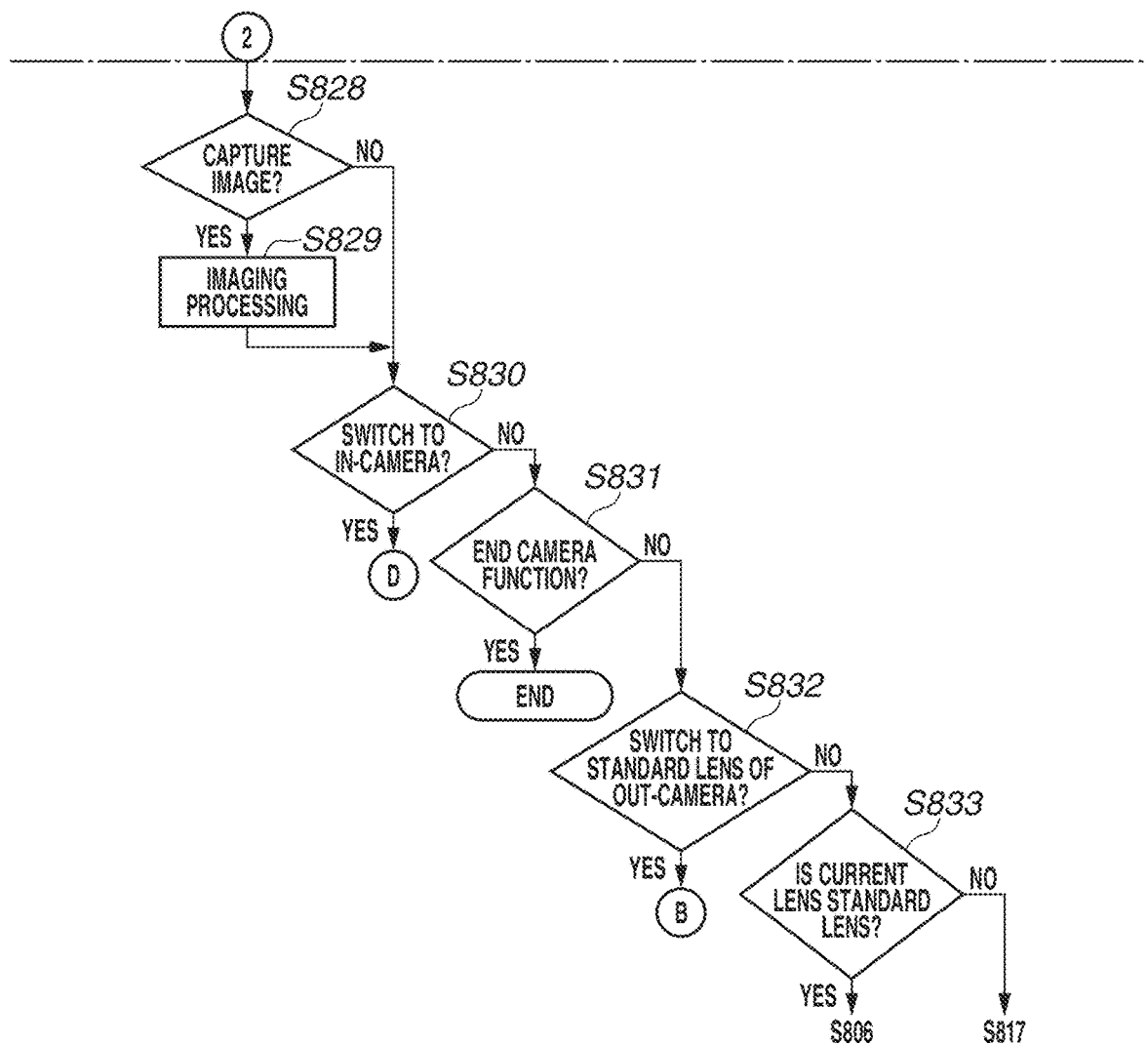

The processing of steps S912 to S915 is similar to that of step S824 to S827 of FIG. 8B. After the end of the processing of step S913 or S915, the processing proceeds to step S908.

In step S916, the system control unit 50 determines whether the currently selected lens is the standard lens. If the currently selected lens is determined to be the standard lens, the processing proceeds to step S904. If not, the processing proceeds to step S907.

According to the exemplary embodiment described above, the user can easily recognize the imaging modes where an image can be captured using the selected lens. More specifically, imaging modes recommended for the lens selected in the picture mode and unrecommended imaging modes (if selected, the lens will be switched) are distinguishably displayed. The user can thus quickly recognize imaging modes suitably selectable at the selected angle of view. Since the unrecommended imaging modes are not hidden, the user can quickly select such an imaging mode without taking the trouble to make an operation of switching the lens if the user wants to give priority to imaging using the features of the imaging mode over the angle of view.

In the foregoing exemplary embodiment, the lens itself to capture an image is described to be switched to a lens capable of imaging if the imaging mode is switched to one where an image is unable to be captured using the lens selected in the picture mode. However, the selected imaging mode may be selected without changing the angle of view, since switching the lens in the picture mode means that the user is likely to have a strong intention to capture an image with the selected angle of view. Note that if the wide-angle lens is used, the background blurring effect can be less effective in the portrait mode, for example. In such a case, the user is notified that the background will not be blurred without switching to the standard lens.

If the user sets the number of pixels of the camera function to a high value, the wide-angle lens is used to capture an image, and imaging using the standard lens can be unavailable. A case where the user sets the number of pixels to a predetermined value or more, i.e., a number of pixels or more where an image is unable to be captured without using the wide-angle lens on a menu screen or setting screen of the camera function will be described. Imaging modes where an image can be captured using the wide-angle lens or the super-wide-angle lens of the out-camera are highlighted. Imaging modes where an image is unable to be captured using the wide-angle lens or the super-wide-angle lens are grayed out. If the user attempts to select a grayed-out imaging mode by a tap operation, a notification that the lens will be switched and the number of pixels will decrease is made. If the user checks the notification and switches to the imaging mode, imaging is performed by reducing the number of pixels and switching to the standard lens. Alternatively, some imaging modes that are recommended may be simply highlighted without graying out unrecommended ones. Conversely, some imaging modes that are unrecommended may be simply grayed out with recommended ones highlighted. In using the newly selected lens, unrecommended or recommended imaging modes are changed in display mode, i.e., grayed out or highlighted depending on the selection of the lens.

This can also prevent the angle of view of the live view image from changing when the user having selected the wide-angle lens switches to an imaging mode where an image is unable to be captured using the wide-angle lens without the intention to switch to the standard lens. In other words, when the user is selecting an imaging mode, the angle of view of the live view image is prevented from becoming standard or returning to wide-angled without the user's intention, depending on changes in the imaging mode. This can improve the user's viewability.

To indicate the selected imaging mode, the display mode of the item corresponding to the selected imaging mode in the item group displayed in the display range 1016 may be changed. For example, the item may be increased in size. The text color may be changed. The item color may be changed. The item corresponding to the selected imaging mode, the items corresponding to the unrecommended imaging modes, and the items corresponding to the recommended imaging modes are displayed in respective different display modes. All such items are displayed in display modes different from that of unselected imaging modes that are neither recommended nor unrecommended. In other words, if a lens is selected and the imaging mode becomes no longer capable of imaging using the selected lens, the display mode of the item is changed to one inconspicuous compared to that of other unselected items. By contrast, if an imaging mode becomes recommendable for the selected lens, the display mode of the item is changed to one conspicuous compared to that of other unselected items.

In some cases, the user can set whether to save the previous imaging settings of the camera function at the activation of the camera function. Here, if the user has made a setting to save the previous imaging settings, the user is likely to be unwilling to change the settings once made. The imaging modes are thus displayed based on the lens selected in the picture mode. More specifically, the imaging modes recommended and unrecommended for the lens selected in the picture mode are made recognizable. By contrast, a user who makes a setting to not save the previous imaging settings is likely to have a strong intention to give priority to the latest settings. In such a case, even if the lenses are already switched, recommended and unrecommended imaging modes are not recognizably displayed based on the lens, since the user is likely to want to give priority to imaging in the imaging mode for which the selection operation is currently made over the already set lens type.

The focal lengths and the imaging angles of view of the standard, wide-angle, and super-wide-angle lenses of the out-camera and the in-camera described above with reference to FIGS. 3 and 4 are just examples and not restrictive. The out-camera is described to include three types of lenses and the in-camera two types of lenses. However, this is not restrictive, and four or more types of lenses or one type of lens may be included.

The foregoing various types of control described to be performed by the system control unit 50 may be performed by a single piece of hardware. A plurality of pieces of hardware (such as a central processing unit [CPU], a microprocessing unit [MPU], and a dedicated circuit) may control the entire apparatus by sharing the processing.

The present invention has been described in detail based on the preferred exemplary embodiments thereof. However, the present invention is not limited to these specific exemplary embodiments, and various modes not departing from the gist of the invention are also included in the present invention. Each of the foregoing exemplary embodiments merely demonstrates an exemplary embodiment of the present invention, and the exemplary embodiments can be combined as appropriate.

The foregoing exemplary embodiments have been described by using a case where the present invention is applied to a smartphone as an example. However, this example is not restrictive, and the present invention can be applied to any electronic apparatus that captures images by switching a plurality of lenses having different focal lengths. More specifically, the present invention can be applied to a digital camera, a portable image viewer, a printer apparatus including a viewfinder, a digital photo frame, a music player, a game machine, an electronic book reader, and the like.

Other Exemplary Embodiments

The present invention is also implemented by executing the following processing. The processing includes supplying software (program) for implementing the functions of the foregoing exemplary embodiments to a system or an apparatus via a network or various recording media, and reading and executing the program code by a computer (or CPU, MPU, or the like) of the system or apparatus. In such a case, the program and a nonvolatile storage medium storing the program constitute the present invention.

The present invention is not limited to the above embodiments and various changes and modifications can be made within the spirit and scope of the present invention. Therefore, to apprise the public of the scope of the present invention, the following claims are made.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, the user can be made easy to select an imaging mode after a lens to be used for imaging is selected from the plurality of lenses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electronic apparatus including a first lens and a second lens at a first side, the second lens having an angle of view different from that of the first lens, the electronic apparatus comprising a memory and at least one processor which, when executing a program stored in the memory, function as:
   a switching unit configured to perform switching between first imaging via the first lens and second imaging via the second lens;
   a control unit configured to control display of items corresponding to a plurality of respective imaging modes along with a captured image on a display unit to select an imaging mode from the plurality of imaging modes, the plurality of imaging modes including an imaging mode where the first imaging and the second imaging are switchable and an imaging mode that enables the first imaging and disables the second imaging; and
   an acceptance unit configured to accept a first operation and a second operation,
   wherein, in a case where the second imaging is being performed, the control unit is configured to:
   control display of a first item and a second item in different display modes, the first item corresponding to an imaging mode that enables the first imaging and the second imaging, the second item corresponding to the imaging mode that enables the first imaging and disables the second imaging, and
   control selection of the second item so that the second item is not selectable by the first operation and the second item is selectable by the second operation, and control a change to the imaging mode corresponding to the second item and switching to the first imaging based on selection of the second item by the second operation.

2. The electronic apparatus according to claim 1, wherein the control unit is configured to, in a case where the first imaging is being performed, control the display of the first item and the second item in a same display mode.

3. The electronic apparatus according to claim 1, wherein the control unit is configured to, in a case where the second imaging is being performed and an instruction to change to an imaging mode that enables the first imaging and disables the second imaging is issued, change the imaging mode and switch to the first imaging.

4. The electronic apparatus according to claim 1, wherein the control unit is configured to, in the case where the second imaging is being performed, perform control so as to gray out the second item.

5. The electronic apparatus according to claim 4, wherein the control unit is configured to cancel gray-out display of the second item based on switching of the second imaging to the first imaging by the switching unit.

6. The electronic apparatus according to claim 1, wherein the control unit is configured to, in a case where the second imaging is being performed and the second item is selected by the second operation, control selection of another item corresponding to another imaging mode that enables imaging by the second imaging and a change to the another imaging mode corresponding to the another item.

7. The electronic apparatus according to claim 1, wherein the first operation is a tap operation, and the second operation is a slide operation.

8. The electronic apparatus according to claim 1, further comprising the display unit.

9. A method for controlling an electronic apparatus including a first lens and a second lens at a first side, the second lens having an angle of view different from that of the first lens, the method comprising:

performing switching between first imaging via the first lens and second imaging via the second lens;

controlling display of items corresponding to a plurality of respective imaging modes along with a captured image on a display unit to select an imaging mode from the plurality of imaging modes, the plurality of imaging modes including an imaging mode where the first imaging and the second imaging are switchable and an imaging mode that enables the first imaging and disables the second imaging; and accepting a first operation and a second operation, wherein, in a case where the second imaging is being performed, the controlling includes:

controlling display of a first item and a second item in different display modes, the first item corresponding to an imaging mode that enables the first imaging and the second imaging, the second item corresponding to the imaging mode that enables the first imaging and disables the second imaging, and controlling selection of the second item so that the second item is not selectable by the first operation and the second item is selectable by the second operation, and controlling a change to the imaging mode corresponding to the second item and switching to the first imaging based on selection of the second item by the second operation.

10. A non-transitory computer-readable storage medium storing a program for causing a computer to function as the units of the electronic apparatus according to claim 1.

* * * * *